US010657660B2

(12) United States Patent
Sato

(10) Patent No.: US 10,657,660 B2
(45) Date of Patent: May 19, 2020

(54) SEARCH ASSIST SYSTEM, SEARCH ASSIST APPARATUS, AND SEARCH ASSIST METHOD

(71) Applicant: TOYOTA JIDOSHA KABUSHIKI KAISHA, Toyota-shi, Aichi-ken (JP)

(72) Inventor: Kazuma Sato, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/392,749

(22) Filed: Apr. 24, 2019

(65) Prior Publication Data

US 2019/0347809 A1 Nov. 14, 2019

(30) Foreign Application Priority Data

May 11, 2018 (JP) .................................. 2018-092442

(51) Int. Cl.
*G06T 7/292* (2017.01)
*H04N 5/247* (2006.01)
*G06K 9/00* (2006.01)
*H04W 4/46* (2018.01)
*G06K 9/62* (2006.01)

(52) U.S. Cl.
CPC .......... *G06T 7/292* (2017.01); *G06K 9/00362* (2013.01); *G06K 9/00624* (2013.01); *G06K 9/00791* (2013.01); *G06K 9/6201* (2013.01); *H04N 5/247* (2013.01); *H04W 4/46* (2018.02); *G06K 2209/15* (2013.01); *G06K 2209/21* (2013.01); *G06K 2209/23* (2013.01); *G06T 2207/30196* (2013.01); *G06T 2207/30252* (2013.01)

(58) Field of Classification Search
CPC ...................................................... G06T 7/292
USPC ......................................................... 348/148
See application file for complete search history.

(56) References Cited

U.S. PATENT DOCUMENTS

2019/0077414 A1\* 3/2019 Garcia .................... G10L 15/22
2019/0272435 A1\* 9/2019 Kundu ............... G06K 9/00798

FOREIGN PATENT DOCUMENTS

| JP | 2005-165616 A | 6/2005 |
| JP | 2007-305155 A | 11/2007 |
| JP | 2010-039825 A | 2/2010 |
| JP | 2015-114851 A | 6/2015 |

(Continued)

*Primary Examiner* — Yulin Sun
(74) *Attorney, Agent, or Firm* — Oliff PLC

(57) ABSTRACT

A search assist system performs search for a subject of search from the images picked up by the on-board cameras. The search assist system includes: a first storage configured to store characteristic information on subjects of identification detected from the images picked up by fixed cameras and information on the fixed cameras; a second storage configured to store location information on vehicles; and one or more first controllers configured to receive characteristic information on the subject of search; determine a search target area based on an installation location of a fixed camera picking up the characteristic information matching the characteristic information on the subject of search; and send, to vehicles within the search target area, search instructions to search for the subject of search by the on-board cameras; and a second controller configured to output an image including the detected characteristic information on the subject of search.

8 Claims, 20 Drawing Sheets

(56) References Cited

FOREIGN PATENT DOCUMENTS

| JP | 2016-076142 A | 5/2016 |
| JP | 2016-119627 A | 6/2016 |
| JP | 2016-126602 A | 7/2016 |
| JP | 2017-004527 A | 1/2017 |

* cited by examiner

FIG. 4

EXAMPLE OF AREA ENTRANCE/EXIT INFORMATION TABLE

| AREA ID | TIMESTAMP | VEHICLE CHARACTERISTIC INFORMATION | FIXED CAMERA ID | ENTRANCE/EXIT |
|---|---|---|---|---|
| A001 | YY:MM:DD:HH:MM:SS | XXXX | CAM001 | ENTRANCE |
| ... | | | | |

FIG. 5

EXAMPLE OF FIXED CAMERA MANAGEMENT INFORMATION TABLE

| AREA ID | FIXED CAMERA ID | LOCATION |
|---|---|---|
| EG001 | CAM001 | PP001 |
| | CAM002 | PP002 |
| | ⋮ | ⋮ |
| | CAM100 | PP100 |
| ⋮ | | |
| EG050 | - | - |

FIG. 6

EXAMPLE OF VEHICLE MANAGEMENT INFORMATION TABLE

| VEHICLE ID | LOCATION INFORMATION | TIME STAMP |
|---|---|---|
| XXXX | PP190 | YY:MM:DD:HH:MM:SS |

FIG. 8

EXAMPLE OF VEHICLE DETECTION INFORMATION TABLE

| VEHICLE CHARACTERISTIC INFORMATION | EDGE SERVER ID | TIMESTAMP |
|---|---|---|
| XXXX | EG001 | YY:MM:DD:HH:MM:SS |

SEARCH ASSIST SYSTEM, SEARCH ASSIST APPARATUS, AND SEARCH ASSIST METHOD

CROSS-REFERENCE TO RELATED APPLICATION

This application claims the benefit of Japanese Patent Application No. 2018-092442, filed on May 11, 2018, which is hereby incorporated by reference herein in its entirety.

BACKGROUND

Technical Field

The present disclosure relates to a search assist system, a search assist apparatus, and a search assist method that search for a subject of search from images or videos picked up by cameras.

Description of the Related Art

In recent year, systems have been disclosed that search for a subject of search based on images picked up by fixed cameras installed at predetermined locations and on-board cameras.

CITATION LIST

Patent Document

Patent document 1: Japanese Patent Laid-Open No. 2010-039825
Patent document 2: Japanese Patent Laid-Open No. 2017-004527
Patent document 3: Japanese Patent Laid-Open No. 2015-114851

If there is no clue to the whereabouts of a subject of search, for example, the whole of Japan is a search target area. However, as the search target area is widened more and more, the amount of data to be checked becomes enormous, and processing loads involved in a whole system also become enormous accordingly. Moreover, it is highly probable that a longer time will be spent before the subject of search is found.

An object of the present disclosure is to provide a search assist system, a search assist apparatus, and a search assist method that can enhance efficiency of search which is based on images or videos picked up by on-board cameras and of which a wide area is set as a target area.

SUMMARY

One aspect of the present disclosure is a search assist system that searches for a subject of search from an image or a video picked up by each of a plurality of on-board cameras. The search assist system includes: a first storage configured to store characteristic information on one or more subjects of identification detected from images or videos picked up by one or more fixed cameras installed at predetermined locations, respectively, and information about the one or more fixed cameras; a second storage configured to store location information on a plurality of vehicles each of which has an on-board camera; and one or more first controllers configured to: receive characteristic information on the subject of search; determine a search target area based on the information, stored in the first storage, about a fixed camera among the one or more fixed cameras that has picked up an image or a video from which characteristic information on a subject among the one or more subjects of identification matching at least part of the characteristic information on the subject of search is detected; and send, to each of vehicles that is present within the search target area, a search instruction to search for the subject of search by using the on-board camera; and a second controller configured to output an image or a video picked up by the on-board camera from which first characteristic information matching at least part of the characteristic information on the subject of search is detected.

According to the one aspect of the present disclosure, images or videos picked up by the on-board cameras used for search are limited to images or videos picked up by the on-board cameras that are present within the search target areas. Thus, for example, even if information other than the characteristic information on the subject of search is not acquired and even if a search area is wide, the amount of picked up images or videos to be searched can be suppressed, and accordingly, processing loads in the whole system can be reduced, and time spent before the subject of search is captured can be shortened, whereby efficiency of search can be enhanced.

Moreover, the search target area is determined based on the information about the fixed camera that has picked up an image or a video from which the characteristic information on the subject of identification matching at least part of the characteristic information on the subject of search is detected. Since fixed cameras offer better image quality than on-board cameras in many cases, the characteristic information on the subject of identification detected from the fixed cameras is more accurate in many cases. Thus, the probability that the subject of search is present within the search target area can be increased, and efficiency of search can be enhanced.

Furthermore, according to the one aspect of the present disclosure, the search target area can be determined even if the information amount of the characteristic information on the subject of search is smaller than the information amount of the characteristic information on the subject of identification detected from the images or the videos picked up by the fixed cameras, or even if the characteristic information on the subject of search partially matches the characteristic information on the subject of identification detected from the images or videos picked up by the fixed cameras. Thus, even if the characteristic information on the subject of search is unreliable, the probability that the subject of search is found can be increased.

In the one aspect of the present disclosure, the subject of search and the one or more subjects of identification may be a moving object or a person, each of the one or more fixed cameras may be installed at a boundary of each of a plurality of areas, the one or more first controllers may detect, from an image or a video picked up by a first fixed camera installed for a first area, that a first subject of identification has entered the first area, the first storage may store an association among the characteristic information on the first subject of identification, identification information on the first area as the information about the first fixed camera, and information indicating entrance into the first area, and when the first storage stores the first characteristic information matching at least part of the characteristic information on the subject of search and when the first characteristic information is associated with the information indicating entrance into the first area, the one or more first controllers may determine the first area associated with the first characteristic information as the search target area.

Each of the plurality of fixed cameras may be installed at a boundary of each of the plurality of areas, whereby the data amount of the picked up images or videos from which the characteristic information on the subject of identification is detected can be reduced. Moreover, the information indicating entrance into the first area may be maintained in the first storage, whereby if the first characteristic information matching at least part of the characteristic information on the subject of search is associated with the information indicating entrance into the first area in the first storage, the first area in which the subject of search is probably present can be determined as the search target area. Thus, the probability that the subject of search is detected from the search target area cart be increased.

Moreover, in the one aspect of the present disclosure, the first storage may store an association among the characteristic information on the first subject of identification, the identification information on the first area as the information about the first fixed camera, the information indicating entrance of the first subject of identification into the first area, and a time of day of the entrance of the first subject of identification into the first area, and when the first storage stores the first characteristic information matching at least part of the characteristic information on the subject of search, when the first characteristic information is associated with the information indicating entrance into the first area, and when elapsed time since the time of day of the entrance into the first area is shorter than a predetermined threshold value, the one or more first controllers may determine the first area associated with the first characteristic information as the search target area, and when the first storage stores the first characteristic information, when the first characteristic information is associated with the information indicating entrance into the first area, and when the elapsed time since the time of day of the entrance into the first area is not shorter than the predetermined threshold value, the one or more first controllers may determine areas around the first area associated with the first characteristic information as the search target area.

If the elapsed time since the time of day of the entrance into the first area is shorter than the predetermined threshold value, it can be thought to be highly probable that the subject of search is present within the first area. On the other hand, if the elapsed time since the time of day of the entrance into the first area is not shorter than the predetermined threshold value, it can be thought to be highly probable that the subject of search has exited the first area. Accordingly, the first area may be determined as the search target area if the elapsed time since the time of day of the entrance into the first area is shorter than the predetermined threshold value, and the areas around the first area may be set as the search target area if the elapsed time since the time of day of the entrance into the first area is not shorter than the predetermined threshold value, whereby the probability that the subject of search is detected within the search target area can be increased.

For example, even if the subject of search moves into an area for which no fixed camera is installed, but if the elapsed time since the time of day of the entrance of the subject of identification, whose characteristic information at least partially matches the characteristic information on the subject of search, into the first area adjacent to the area is not shorter than the predetermined threshold value, the area is determined as the search target area. Thus, even if the subject of search moves into an area for which no fixed camera is installed, the probability that the subject of search can be detected can be increased.

Further, in the one aspect of the present disclosure, the one or more first controllers may detect, from an image or a video picked up by a second fixed camera installed for a second area, that a second subject of identification has exited the second area, the first storage may store an association among the characteristic information on the second subject of identification, identification information on the second area as the information about the second fixed camera, and information indicating exit of the second subject of identification from the second area, and when the first storage stores the first characteristic information matching at least part of the characteristic information on the subject of search and when the first characteristic information is associated with the information indicating exit from the second area, the one or more first controllers may determine areas around the second area associated with the first characteristic information as the search target area.

In this case, the first storage may store an association among the characteristic information on the second subject of identification, the identification information on the second area and identification information on the second fixed camera as the information about the second fixed camera, and the information indicating exit of the second subject of identification from the second area, and when the first storage stores the first characteristic information and when the first characteristic information is associated with the information indicating exit from the second area, the one or more first controllers may determine any of the areas around the second area that exist in an exiting direction of the second subject of identification from an installation location of the second fixed camera, as the search target area.

If the information indicating exit of a second subject of identification, whose characteristic information at least partially matches the characteristic information on the subject of search, from the second area is stored in the first storage, it is highly probable that the subject of search is present within areas existing around the second area or in the exiting direction. Accordingly, if the information indicating exit of the second subject of identification, whose characteristic information at least partially matches the characteristic information on the subject of search, from the second area is stored in the first storage, areas existing around the second area or in the exiting direction may be determined as the search target area, whereby the probability that the subject of search is detected within the search target area can be increased.

Furthermore, in the one aspect of the present disclosure, each vehicle that has received the search instruction from the one or more first controllers may send out the search instruction by vehicle-to-vehicle communication. Thus, the search instruction is further expanded to other vehicles by each vehicle that has received the search instruction, whereby speed of expansion of the search instruct-on is enhanced.

Another aspect of the present disclosure is a search assist apparatus, including: a first storage configured to store characteristic information on one or more subjects of identification detected from images or videos picked up by one or more fixed cameras installed at predetermined locations, respectively, and information about the one or more fixed cameras; a second storage configured to store location information on a plurality of vehicles each of which has an on-board camera; and one or more controllers configured to: receive characteristic information on a subject of search;

determine a search target area based on the information, stored in the first storage, about a fixed camera among the one or more fixed cameras that has picked up an image or a video from which characteristic information on a subject among the one or more subjects of identification matching at least part of the characteristic information on the subject of search is detected; and send, to a plurality of vehicles that are present within the search target area, search instructions to send an image or a video picked up by the on-board camera.

Still another aspect of the present disclosure is a search assist method for searching for a subject of search from an image or a video picked up by each of a plurality of on-board cameras. The search assist method includes: storing, in a first storage, characteristic information on one or more subjects of identification detected from images or videos picked up by one or more fixed cameras installed at predetermined locations, respectively, and information about the one or more fixed cameras; storing, in a second storage, location information on a plurality of vehicles each of which has an on-board camera, respectively; detecting the characteristic information on the one or more subjects of identification from the images or the videos picked up by the one or more fixed cameras; receiving characteristic information on a subject of search; determining a search target area based on the information, stored in the first storage, about a fixed camera among the one or more fixed cameras that has picked up an image or a video from which characteristic information on a subject among the one or more subjects of identification matching at least part of the characteristic information on the subject of search is detected; sending, to each vehicle that is present within the search target area, a search instruction to search for the subject of search by using the on-board camera; and outputting an image or a video picked up by the on-board camera from which first characteristic information matching at least part of the characteristic information on the subject of search is detected. Note that the technical ideas disclosed with respect to the search assist system as described above can be applied to the search assist apparatus and the search assist method as described above as long as no technical contradiction arises.

According to the present disclosure, in search of a wide search target area, efficiency of search based on images or videos picked up by on-board cameras can be enhanced, while a wide area is set as a search target area.

BRIEF DESCRIPTION OF DRAWINGS

FIG. 4 is an example of the area entrance/exit information table;

FIG. 5 is an example of a fixed camera management information table;

FIG. 6 is an example of a vehicle management information table;

FIG. 8 is an example of a vehicle detection information table;

DESCRIPTION OF THE EMBODIMENT

Hereinafter, an embodiment of the present disclosure will be described with reference to the drawings. The configuration of the following embodiment is merely an example, and the present disclosure is not limited to the configuration of the embodiment.

First Embodiment

Figure 1:
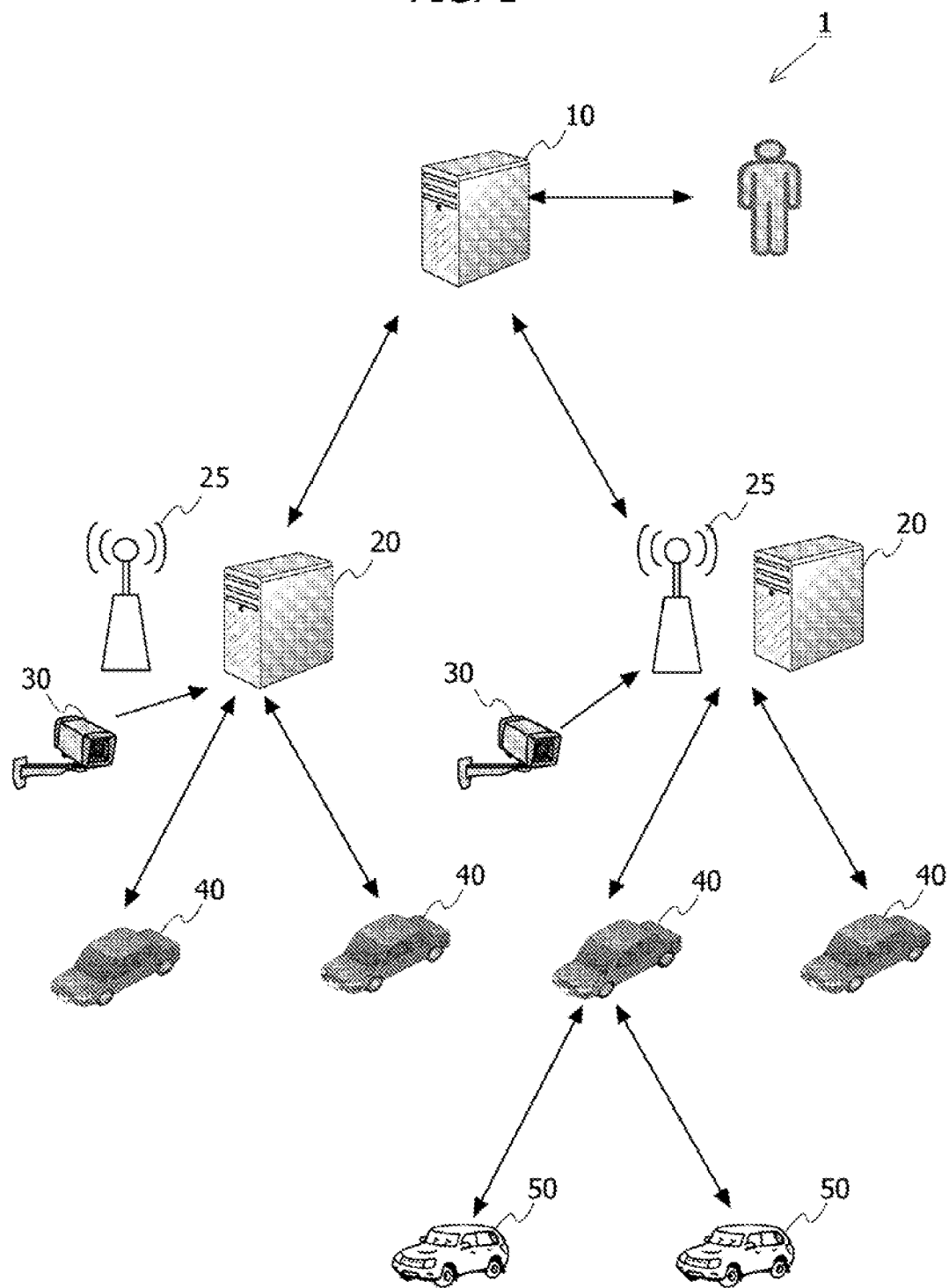
FIG. 1 is a diagram illustrating an example of a system configuration of a search assist system according to a first embodiment.

FIG. 1 is a diagram illustrating an example of a system configuration of a search assist system according to a first embodiment. The search assist system 1 is a system that assists in searching for a subject-of-search vehicle from images or videos picked up by on-board cameras mounted on vehicles. The search assist system 1 is an example of a "search assist system".

The search assist system 1 includes a center server 10, a plurality of edge servers 20, a plurality of fixed cameras 30, and a plurality of vehicles 40. In FIG. 1, vehicles 50 are also depicted. The center server 10 manages the plurality of edge servers 20.

Each edge server 20 is associated with base stations 25 and manages vehicles 40 that are covered by the associated base stations 25. Each edge server 20 may be associated with one base station 25 or may be associated with a plurality of base stations 25. However, in the first embodiment, it is assumed that each edge server 20 is associated with a plurality of base stations 25. A vehicle 40 that is covered by a base station 25 refers to a vehicle 40 that is located within a communication range of the base station 25 and connects to a network and performs communication via the base station 25.

Each base station 25 is, for example, a mobile telephone base station. However, this is not restrictive, and each base station 25 may be an access point of a wireless LAN (Local Area Network) or a base station of WiMAX (Worldwide interoperability for Microwave Access). Each base station 25 performs communication with the vehicles 40 in accordance with a predetermined wireless communication scheme.

Each fixed camera 30 is a camera that is installed in such a manner as to be able to pick up an image of a road through which a management area managed by an edge server 20 can be entered and exited. That is, each fixed camera 30 is a camera that is installed near a boundary of a management area. In the first embodiment, cameras that are installed on the roadsides of all roads through which the management areas managed by the edge servers 20 can be entered and exited are adopted as the fixed cameras 30. However, this is not restrictive, and cameras that are installed on the roadsides of some of the roads through which the management areas managed by the edge servers 20 can be entered and exited may be adopted as the fixed cameras 30. Each fixed camera 30 an example of a "fixed camera".

A management area managed by an edge server 20 and the communicable range of a base station 25 may be identical or may be different from each other. In the first embodiment, it is assumed that a management area and the communicable range of a base station 25 are an identical area. Hereinafter, a management area will be simply referred to as an area. That is, in the first embodiment, since each edge server 20 is associated with a plurality of base each edge server 20 manages a plurality of management areas.

In the first embodiment, it is assumed that the angle of view of each fixed camera 30 is fixed in one direction. However, this is not restrictive, and the angle of view of each fixed camera 30 may be changed automatically or manually. Each fixed camera 30 may be a camera that is specific to the search assist system 1, or may be, for example, a surveillance camera installed at a shop or a public automatic license-plate reader (a camera of the so-called N-system). Each fixed camera 30 includes a function of communicating with the edge servers 20. Each fixed camera 30 may communicate with the edge servers 20 by wireless communication, or may communicate with the edge servers 20 by wired communication.

Each fixed camera 30 analyzes a picked up image or video through image processing and detects vehicle characteristic information, which is information about an external visual characteristic of a vehicle. The vehicle characteristic information is, for example, information on part or all of a vehicle identification number displayed on a license plate, a vehicle type, a vehicle color, and the like. In the first embodiment, a vehicle identification number displayed on a license plate is used for the vehicle characteristic information. Each fixed camera 30 detects entrance of a vehicle into and exit of a vehicle from a management area around which the fixed camera 30 is installed, from the detected vehicle characteristic information. Each fixed camera 30 sends a result of the detection of entrance of a vehicle into or exit of a vehicle from the management area to a relevant edge server 20. Hereinafter, a vehicle identification number displayed on a license plate of a vehicle will be simply referred to as a number. A management area will be simply referred to as an area. Each vehicle is an example of a "subject of search" and an example of a "subject of identification". The vehicle characteristic information is an example of "characteristic information".

Each vehicle 40 is a vehicle that is capable of wireless communication with each edge server 20 via a base station 25 associated with the edge server 20 and is mounted with an on-board device capable of executing functions, which will be described later, and a camera. Hereinafter, a camera mounted on a vehicle will be referred to as an on-board camera. Each vehicle 40, upon receiving an instruction from an edge server 20, starts processing of detecting vehicle characteristic information from an image or a video picked up by the on-board camera through image processing. If a vehicle 40 recognizes vehicle characteristic information that matches vehicle characteristic information on a subject-of-search vehicle, the vehicle 40 sends the picked up image or video to the center server 10. Hereinafter, an on-board device mounted on each vehicle 40 will be referred to as a dedicated on-board device. A vehicle 40 will be also referred to as a vehicle mounted with the dedicated on-board device in some cases.

Each vehicle 50 is a vehicle that is mounted with an on-board device having no function of communicating with the edge servers 20 and an on-board camera. Each vehicle 50 is mounted with the on-board device that has no function of communicating with the edge servers 20 but has a function of performing vehicle-to-vehicle communication with the vehicles 40. It depends on, for example, the type of an on-board device, the manufacturer of an on-board device or a vehicle, the service subscription status of a user who owns a vehicle, or the like, whether or not the on-board device has the function of communicating with the edge servers 20.

Each vehicle 50, upon receiving an instruction from a vehicle 40 by vehicle-to-vehicle communication, performs processing similar to the processing performed by each vehicle 40. Hereinafter, a vehicle 50 will be also referred to as a vehicle mounted with no dedicated on-board device. Note that each of the vehicles 40 and the vehicles 50 may be a vehicle driven by a driver or may be a vehicle capable of autonomous cruising without a driver.

In the first embodiment, in broad categories, processing of monitoring a vehicle detection state and processing of searching for a vehicle are performed in the search assist system 1. Specifically, the processing of monitoring a vehicle detection state is performed as described below.

The edge servers 20 monitor the respective own covered management areas, for entrance and exit of vehicles. More specifically, the edge servers 20 receive, from the own covered fixed cameras 30, results of detection of entrance of vehicles into and exit of vehicles from the respective own covered management areas, and hold records of the entrance of the vehicles into and the exit of the vehicles from the respective own covered management areas. Moreover, the edge servers 20, upon detecting entrance of a vehicle into or exit of a vehicle from the respective own covered management areas, notify vehicle characteristic information on the entering or exiting vehicle to the center server 10. The center server 10, upon receiving the notification from each edge server 20, holds an association between the vehicle characteristic information and the edge server 20. That is, the center server 10 monitors vehicle characteristic information on vehicles that may be present in the management areas covered by the edge servers 20.

Next, in the search assist system 1, the processing of searching for a vehicle is performed as described below. The center server 10 receives an input of a search request to search for a vehicle from a searcher. Vehicle characteristic information on the subject-of-search vehicle is also inputted along with the search request. The search request is expanded from the center server 10 to an edge server 20, from the edge server 20 to vehicles 40, and from the vehicles 40 to vehicles 50. First, the center server 10, by using the vehicle characteristic information on the subject-of-search vehicle, searches the held associations between the vehicle characteristic information and the edge servers 20, and sends a search request to an edge server 20 that is associated with a vehicle characteristic information piece that matches the vehicle characteristic information on the subject-of-search vehicle. The edge server 20 that has received the search request determines a search target area based on records of entrance and exit of the subject-of-search vehicle, and sends a search instruction to each vehicle 40 within the search target area. Each vehicle 40, upon receiving the search instruction, sends a search instruction to each vehicle 50 that is present nearby by vehicle-to-vehicle communication.

Each vehicle 40 and each vehicle 50, upon receiving the search instruction, start processing of recognizing the vehicle characteristic information from images or videos picked up by the on-board camera. For example, each vehicle 40 and each vehicle 50, upon detecting the vehicle characteristic information on the subject-of-search vehicle, sends a relevant image or video picked up by the on-board camera to the center server 10. The center server 10 outputs the image or the video picked up by the on-board camera from the vehicle 40 or the vehicle 50 to, for example, a display or an information terminal into which the search request has been inputted.

In the first embodiment, entrance of vehicles into and exit of vehicles from the management areas of the edge servers 20 are monitored, and when a search request to search for a vehicle arises, a search target area is narrowed down based on records of entrance of the vehicle into and exit of the vehicle from each management area, whereby the data amount of subject-of-search image data is reduced, and efficiency of search is enhanced. Moreover, images obtained by fixed cameras have better image quality than images obtained by on-board cameras in many cases, and therefore by using images picked up by the fixed cameras, accuracy in narrowing down the search target area is enhanced, and accuracy in search is enhanced accordingly. Each edge server 20 is an example of a "search assist apparatus".

<Apparatus Configuration>

Figure 2:
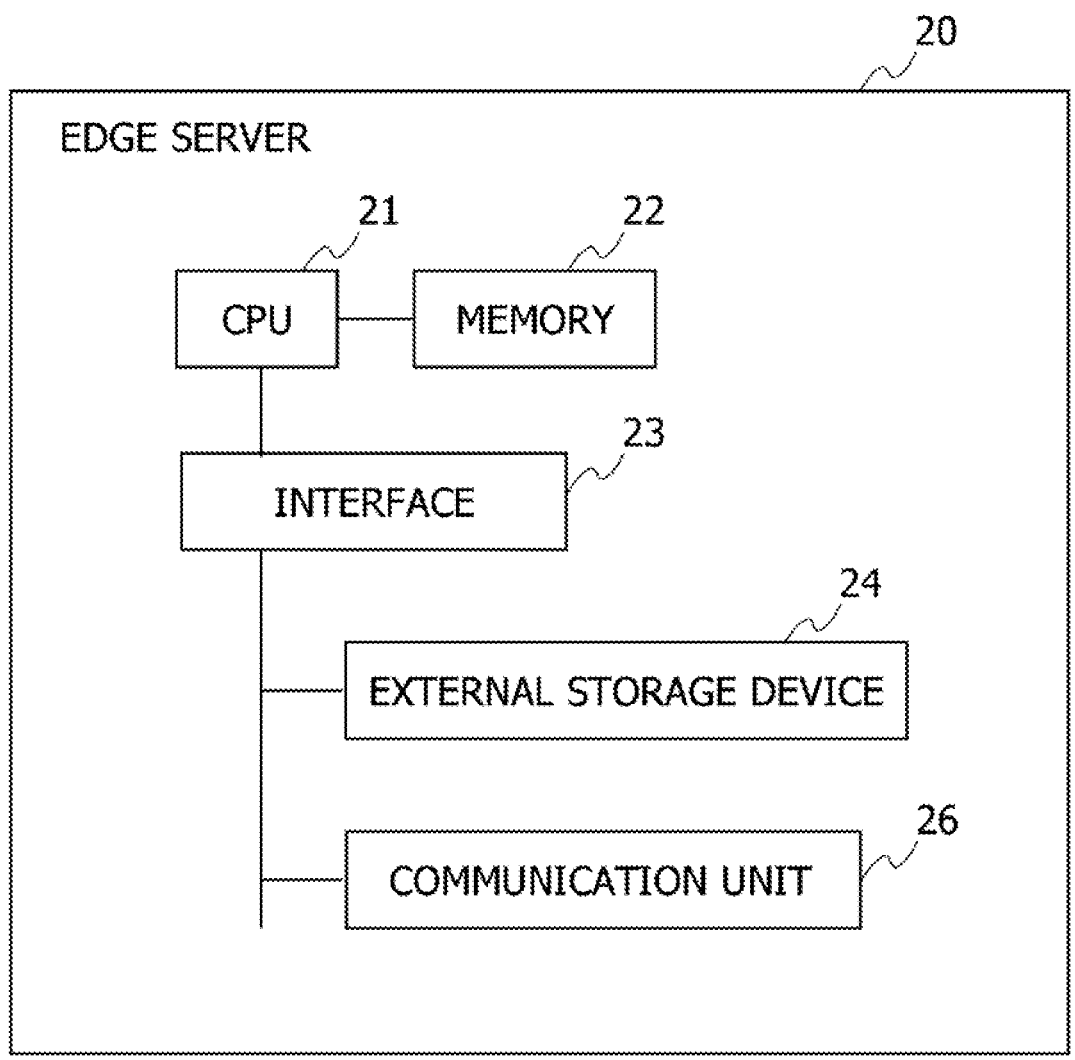
FIG. 2 is a diagram illustrating an example of a hardware configuration of any one of the edge servers.

FIG. 2 is a diagram illustrating an example of a hardware configuration of any one of the edge servers 20. The edge server 20 includes a CPU 21, a memory 22, an interface 23, an external storage device 24, and a communication unit 26, as hardware constituent elements. The external storage device 24 and the communication unit 26 are connected to the interface 23.

The CPU 21 executes a computer program that is expanded on the memory 22 to be executable, and performs processing as an edge server 20. The memory 22 stores the computer program to be executed by the CPU 21, data to be processed by the CPU 21, and the like. The memory 22 is, for example, a Dynamic Random Access Memory (DRAM), a Static Random Access Memory (SRAM), a Read Only Memory (ROM), or the like. The external storage device 24 is a non-volatile storage device and is, for example, a hard disk drive, a Solid State Drive (SSD), or the like.

The communication unit 26 connects to a public communication network via, for example, a LAN and communicates with the center server 10, the vehicles 40, and the like on a network via the public communication network. Although the interface 23 is illustrated in FIG. 2, transmission and reception of signals between the CPU 21 and each of the external storage device 24 and the communication unit 26 are not limited to via the interface 23. That is, the CPU 21 may have a plurality of signal transmission and reception paths other than the interface 23. In FIG. 2, the edge server 20 includes the single CPU 21. However, the CPU is not limited to a single processor, but may have a multi-processor configuration. The single CPU connected through a single socket may have a multi-core configuration. At least part of the processing performed by each of the above-mentioned units may be performed by another processor than the CPU, for example, a dedicated processor such as a Digital Signal Processor (DSP), a Graphics Processing Unit (CPU), or the like. At least part of the processing performed by each of the above-mentioned units may be implemented as an integrated circuit (IC) or any other digital circuit. At least part of the above-mentioned units may include an analog circuit.

Figure 3:
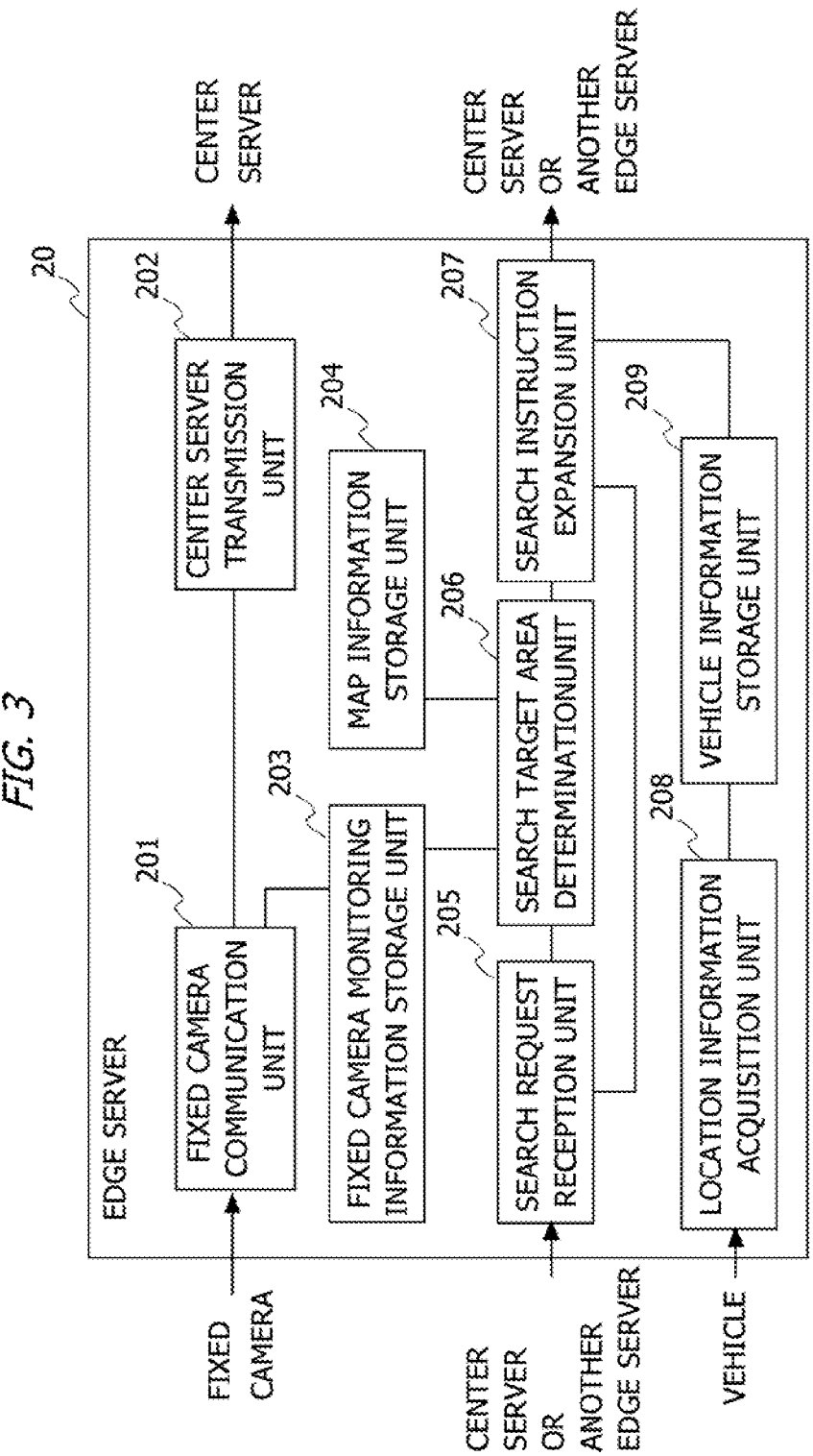
FIG. 3 is a diagram illustrating an example of a functional configuration of any one of the edge servers.

FIG. 3 is a diagram illustrating an example of a functional configuration of any one of the edge servers 20. The edge server 20 operates as each unit illustrated in FIG. 3 through the computer program on the memory 22. That is, the edge server 20 includes a fixed camera communication unit 201, a center server transmission unit 202, a fixed camera monitoring information storage unit 203, a map information storage unit 204, a search request reception unit 205, a search target area determination unit 206, a search instruction expansion unit 207, a location information acquisition unit 208, and a vehicle information storage unit 209, as functional components.

The fixed camera communication unit 201 is an interface with the covered fixed cameras 30. For example, the fixed camera communication unit 201 receives area entrance/exit information from each fixed camera 30. The area entrance/exit information is information about entrance of a vehicle into or exit of a vehicle from an area detected by each fixed camera 30. Specifically, the area entrance/exit information includes, for example, detected vehicle characteristic information, identification information on an area a detected vehicle has entered or exited, information indicating entrance or exit, and a timestamp. The fixed camera communication unit 201 stores the area entrance/exit information in the fixed camera monitoring information storage unit 203.

The fixed camera communication unit 201 creates vehicle detection information including, for example, the vehicle characteristic information included in the area entrance/exit information and identification information on the own edge server 20 and outputs the vehicle detection information to the center server transmission unit 202.

The center server transmission unit 202 is an interface with the center server 10. The center server transmission unit 202 receives an input of vehicle detection information from the fixed camera communication unit 201, and sends the vehicle detection information to the center server 10.

The fixed camera monitoring information storage unit 203 is created, for example, within the external storage device 24 of the edge server 20. For example, an area entrance/exit information table is stored in the fixed camera monitoring information storage unit 203. Details of the area entrance/exit information table will be described later.

The map information storage unit 204 is created, for example, within the external storage device 24 of the edge server 20. The map information storage unit 204 includes, for example, area management information about each area in the search assist system 1 and fixed camera management information about each fixed camera 30 covered by the edge server 20.

The area management information includes, for example, map information indicating a deployment of each area and information about an edge server 20 that manages the area. The information about an edge server 20 that manages the area includes, for example, identification information on the edge server 20 and the like, which are used for communication with the edge server 20. Note that the area management information is not limited to being held for all areas in the search assist system 1, but may be held for, for example, partial areas existing around the own edge server 20.

The fixed camera management information includes, for example, identification information on an area around which a fixed camera 30 is installed, identification information on the fixed camera 30, and a location of the fixed camera 30.

The search request reception unit 205 receives a search request and a search completion notification from the center server 10 or another edge server 20. Vehicle characteristic information, which indicates an external visual characteristic of a subject-of-search vehicle, is also received along with the search request. Moreover, from another edge server 20, search target area information is also received along with the search request. The search target area information received from another edge server 20 includes, for example, identification information on an area covered by the own edge server 20 that is included in a search target area determined by the other edge server 20. The search request reception unit 205 outputs the search request and the like and the search completion notification received from, for example, the center server 10 to the search target area determination unit 206. The search request reception unit 205 output the search request and the like received from, for example, another edge server 20 to the search instruction expansion unit 207.

The search target area determination unit 206 receives an input of a search request from the search request reception unit 205 and determines a search target area based on the information stored in the fixed camera monitoring information storage unit 203 and the map information storage unit 204. Details of processing of determining the search target area will be described later. The search target area determination unit 206 creates search target area information about the determined search target area and outputs the search target area information to the search instruction expansion unit 207. The search target area information created by the search target area determination unit 206 includes, for example, identification information on an area determined as the search target area by the search target area determination unit 206.

The search instruction expansion unit 207 receives an input of search target area information from the search target area determination unit 206 and the search request reception unit 205. The search instruction expansion unit 207 refers to the vehicle information storage unit 209, which will be described later, extracts each vehicle 40 that is present within the search target area, and sends a search instruction to each extracted vehicle 40. Vehicle characteristic information on a subject-of-search vehicle is also sent along with the search instruction. If the search target area information inputted from the search target area determination unit 206 includes an area covered by another edge server 20, the search instruction expansion unit 207 sends a search request to the other edge server 20. The vehicle characteristic information on the subject-of-search vehicle and the search target area information including identification information on the area covered by the other edge server 20 that is included in the search target area determined by the search target area determination unit 206 are also sent to the other edge server 20 along with the search request.

The search instruction expansion unit 207 receives an input of a search completion notification from the search request reception unit 205. The search instruction expansion unit 207 sends the inputted search completion notification to another edge server 20 that is a destination of a search request and each vehicle 40 that is present within the search target area.

The location information acquisition unit 208 receives location information from each vehicle 40 that is present within the own covered areas at predetermined periods. The location information acquisition unit 208 stores the received location information on each vehicle 40 in the vehicle information storage unit 209.

The vehicle information storage unit 209 is created, for example, within the external storage device 24 of the edge server 20. The vehicle information storage unit 209 stores vehicle management information about each vehicle 40 located in coverage of the edge server 20. The vehicle management information includes, for example, identification information on a vehicle 40 and location information on the vehicle 40.

FIG. 4 is an example of the area entrance/exit information table. The area entrance/exit information table is held in the fixed camera monitoring information storage unit 203 of each edge server 20. The area entrance/exit information table stores area entrance/exit information received from each own covered fixed camera 30. Specifically, the area entrance/exit information table includes area ID, timestamp, vehicle characteristic information, fixed camera ID, and entrance/exit fields.

In the area ID field, identification information on an area into which entrance of a vehicle, or from which exit of a vehicle, is detected by a fixed camera 30 is inputted. In the timestamp field, a time of day at which the entrance of the vehicle into or the exit of the vehicle from the area is detected is inputted. Specifically, a time of day inputted in the timestamp field is a timestamp that is attached to an image or a video picked up by the fixed camera 30 and is included in the area entrance/exit information. In the vehicle characteristic information field, detected vehicle characteristic information is inputted. Note that in the first embodiment, the vehicle characteristic information that is detected from the picked up image or video by the fixed camera 30 and adopted is assumed to be a complete set of information that is used for vehicle characteristic information. For example, in a case where vehicle characteristic information is a number displayed on a license plate, the vehicle characteristic information that is detected from the picked up image or video by the fixed camera 30 and adopted is all information displayed on a license plate. However, this is not restrictive, and in some embodiments, the vehicle characteristic information that is detected from the picked up image or video by the fixed camera 30 may be incomplete.

In the fixed camera ID field, identification information on the fixed camera 30 that has picked up the image or the video from which the entrance of the vehicle into or the exit of the vehicle from the area is detected. In the entrance/exit field, information indicating whether the vehicle has entered the area or has exited the area is included. For example, in the entrance/exit field, any one of "entrance" and "exit" may be inputted, or a flag may be inputted.

A new entry in the area entrance/exit information table is created, for example, when area entrance/exit information is received from a fixed camera 30. For example, the area entrance/exit information table may be refreshed, or stored information may be moved to another apparatus, at predetermined periods. Alternatively, for example, if vehicle characteristic information included in area entrance/exit information received from a fixed camera 30 matches a value in the vehicle characteristic information field of an entry, the entry is deleted or overwritten with the received area entrance/exit information. Note that management of the area entrance/exit information table as described above is performed by, for example, the fixed camera communication unit 201 of each edge server 20. Note that a data structure of the area entrance/exit information table is not limited to the data structure illustrated in FIG. 4.

FIG. 5 is an example of a fixed camera management information table. The fixed camera management information table is held in the map information storage unit 204 of each edge server 20. The fixed camera management information table stores fixed camera management information on each fixed camera 30 that is installed for each area covered by the edge server 20. The fixed camera management information table includes, for example, area ID, fixed camera ID, and location fields.

In the area ID field, identification information on an area covered by the edge server 20 is inputted. In the fixed camera ID field, identification information on a fixed camera 30 installed for the area is inputted. In the location field, location information on an installation location of the fixed camera 30 is inputted.

For example, the fixed camera management information table is set beforehand by a manager of the search assist system 1. When an addition, a deletion, a change, or the like of a fixed camera 30 occurs, for example, the fixed camera management information table is updated beforehand by the manager of the search assist system 1.

FIG. 6 is an example of a vehicle management information table. The vehicle management information table is held, for example, in the vehicle information storage unit 209 of each edge server 20. The vehicle management information table stores, for example, vehicle management information on each vehicle 40 that is present within each area covered by the edge server 20. The vehicle management information table includes, for example, vehicle ID, location information, and timestamp fields.

In the vehicle ID field, identification information on a vehicle 40 is inputted. For the identification information on the vehicle 40, a number of the vehicle 40 may be used. In the location information field, location information on the vehicle 40, which is received from the vehicle 40, is inputted. The location information on the vehicle 40 may be any of, for example, a latitude and a longitude, an address, and the like.

In the timestamp field, for example, a time of day at which the edge server 20 receives the location information from the vehicle 40 is inputted. However, this is not restrictive, and in the timestamp field, for example, a time of day at which the vehicle 40 acquires the location information may be inputted if the time of day at which the vehicle 40 acquires the location information is sent from the vehicle 40 along with the location information.

Each vehicle 40 sends location information to the edge server 20, for example, at predetermined periods. In the vehicle management information table, each time location information is received from a vehicle 40, an entry that has a matching value in the vehicle ID field is updated. Moreover, for example, when a vehicle 40 moves from an area covered by the edge server 20 to an area covered by another edge server 20, location information from the vehicle 40 does not reach the original edge server 20. Accordingly, if location information in the vehicle management information table is not updated even after a predetermined time period has passed since a time of day indicated in the timestamp field, the corresponding entry is deleted.

Figure 7:
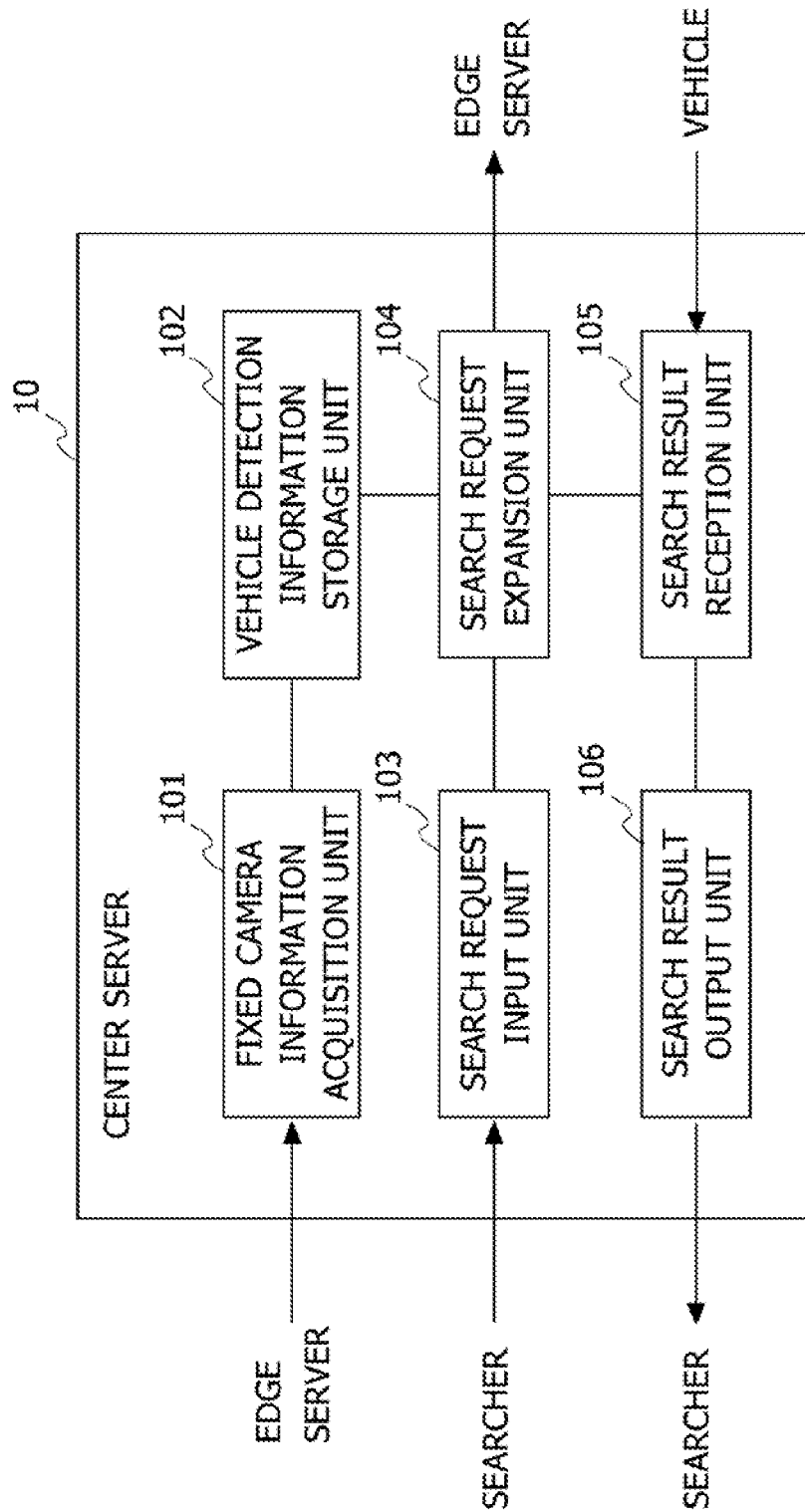
FIG. 7 is a diagram illustrating an example of a functional configuration of the center server.

FIG. 7 is a diagram illustrating an example of a functional configuration of the center server 10. Note that a hardware configuration of the center server 10 is similar to the hardware configuration of the edge servers 20 and includes a CPU, a memory, an external storage device, and a communication unit, and therefore a depiction thereof is omitted.

The center server 10 operates as each unit illustrated in FIG. 7 through a computer program on the memory. That is, the center server 10 includes a fixed camera information acquisition unit 101, a vehicle detection information storage unit 102, a search request input unit 103, a search request expansion unit 104, a search result reception unit 105, and a search result output unit 106, as functional constituent elements.

The fixed camera information acquisition unit 101 receives vehicle detection information from each edge server 20. The vehicle detection information includes, for example, vehicle characteristic information detected from an image or a video picked up by a fixed camera 30 and identification information on an edge server 20 that covers the fixed camera 30. The fixed camera information acquisition unit 101 registers the received vehicle detection information in the vehicle detection information storage unit 102. At this time, for example, the fixed camera information acquisition unit 101 deletes a record stored in the vehicle detection information storage unit 102 if vehicle characteristic information of the record matches vehicle characteristic information included in the received vehicle detection information.

The vehicle detection information storage unit 102 is created, for example, within the external storage device of the center server 10. The vehicle detection information storage unit 102 stores vehicle detection information received from each edge server 20. The vehicle detection information includes, for example, an association between vehicle characteristic information detected from an image or a video picked up by a fixed camera 30 and an edge server 20 that covers an area of detection. Details will be described later.

The search request input unit 103 receives an input of a search request from a searcher. For example, the search request from the searcher may be directly inputted from an input device (a key board or the like) connected to the center server 10 or may be inputted via a network. Vehicle characteristic information on a subject-of-search vehicle is also inputted along with the search request. The vehicle characteristic information on the subject-of-search vehicle inputted from the searcher does not need to be complete information. For example, in a case where a number displayed on a license plate is used for vehicle characteristic information, part of a number of the subject-of-search vehicle may be inputted. The search request input unit 103 outputs the inputted search request and vehicle characteristic information on the subject-of-search vehicle to the search request expansion unit 104.

The search request expansion unit 104 receives an input of a search request and vehicle characteristic information on a subject-of-search vehicle from the search request input unit 103. The search request expansion unit 104 determines whether or not the vehicle characteristic information on the subject-of-search vehicle is recorded in the vehicle detection information storage unit 102. If vehicle characteristic information that matches the vehicle characteristic information on the subject-of-search vehicle is recorded in the vehicle detection information storage unit 102, the search request expansion unit 104 sends a search request to an edge server 20 that is associated with the vehicle characteristic information on the subject-of-search vehicle in the vehicle detection information storage unit 102. The vehicle characteristic information on the subject-of-search vehicle is also sent along with the search request.

The search result reception unit 105 receives an image or a video picked up by an on-board camera, as a result of search, from a vehicle 40 or a vehicle 50 that has detected vehicle characteristic information on a subject-of-search vehicle from the image or the video picked up by the on-board camera. The image or the video picked up by the on-board camera that is received by the search result reception unit 105 is, for example, outputted to the searcher from the search result output unit 106. For the searcher, the output is made to, for example, an output device such as a display connected to the center server 10, or a terminal via a network.

FIG. 8 is an example of a vehicle detection information table. The vehicle detection information table is held in the vehicle detection information storage unit 102 of the center server 10. The vehicle detection information table stores vehicle detection information received from each edge server 20. The vehicle detection information table includes vehicle characteristic information, edge server ID, and timestamp fields.

In the vehicle characteristic information field, vehicle characteristic information detected from an image or a video picked up by a fixed camera 30 is inputted. In the edge server ID field, identification information on an edge server 20 included in the vehicle detection information, that is, an edge server 20 that covers an area around which the vehicle characteristic information is detected is inputted.

In the timestamp field, for example, a time of day at which the center server 10 receives the vehicle detection information from the edge server 20 is inputted. However, this is not restrictive, and for example, if the vehicle detection information from the edge server 20 includes a timestamp (a time of day at which the picked up image or video from which the vehicle characteristic information is detected is shot), which is included in area entrance/exit information from the fixed camera 30, the timestamp may be inputted in the timestamp field.

In the first embodiment, for vehicle characteristic information detected from each fixed camera 30, all information displayed on a license plate is assumed. Information displayed as license plate is information uniquely assigned to each vehicle. Accordingly, in the first embodiment, when vehicle detection information is newly received, an entry that overlaps with vehicle characteristic information included in the received vehicle detection information is deleted from the vehicle detection information table, regardless of entrance of the vehicle into or exit of the vehicle from an area. Moreover, the newly received vehicle detection information is added to the vehicle detection information table as a new entry. That is, in the first embodiment, the center server 10 holds latest information pieces of information about entrance into and exit from each area, for each vehicle whose entrance into an area or whose exit from an area is detected from an image or a video picked up by a fixed camera 30. Thus, the center server 10 has information that serves as a clue in identifying an area in which the subject-of-search vehicle is present.

Figure 9:
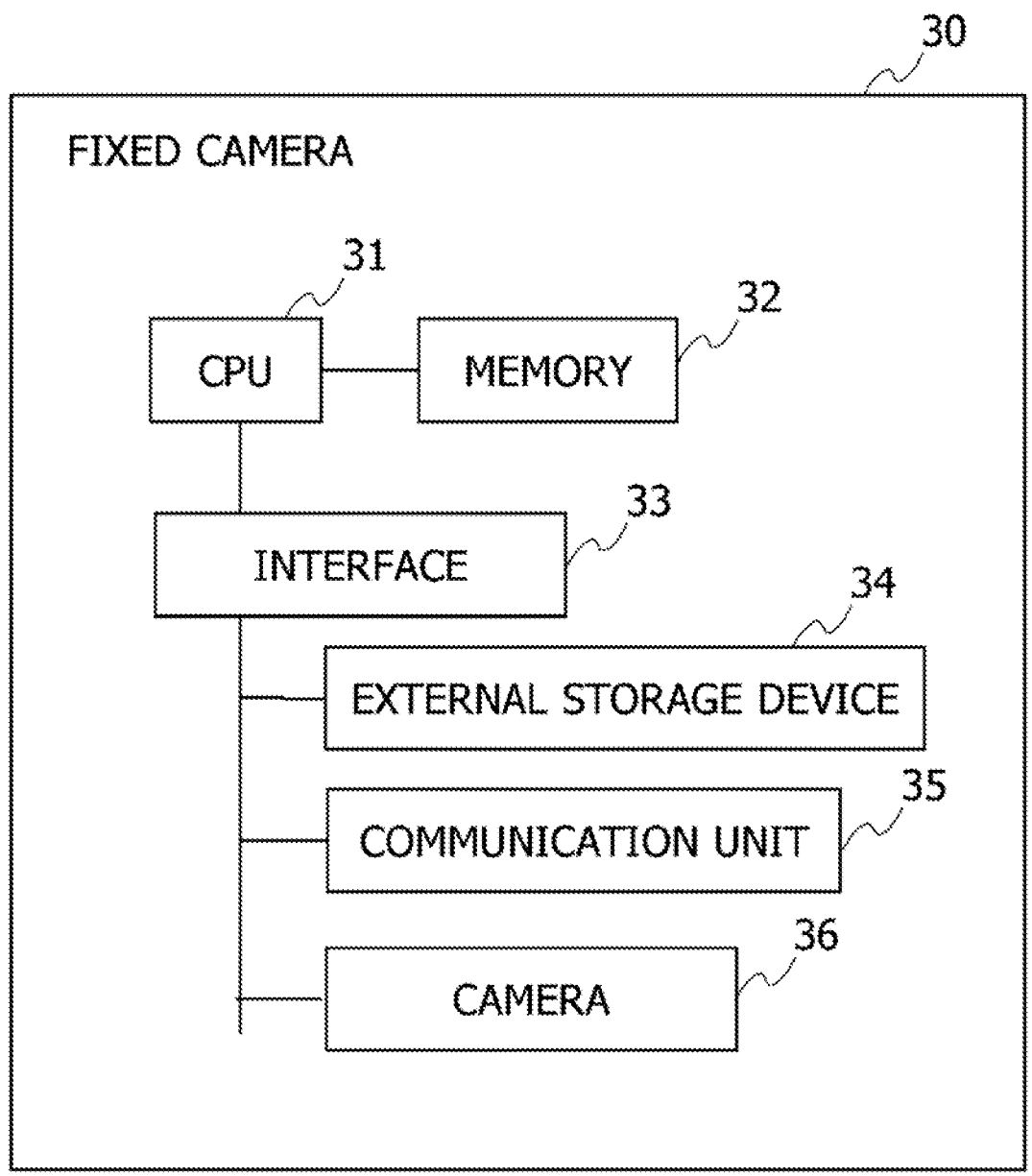
FIG. 9 is a diagram illustrating an example of a hardware configuration of any one of the fixed cameras.

FIG. 9 is a diagram illustrating an example of a hardware configuration of any one of the fixed cameras 30. The fixed camera 30 includes a CPU 31, a memory 32, an interface 33, an external storage device 34, a communication unit 35, and a camera 36. Configurations and operations of the CPU 31, the memory 32, the interface 33, the external storage device 34, and the communication unit 35 are similar to the configurations and operations of the CPU 21, the memory 22, the interface 23, the external storage device 24, and the communication unit 26 in FIG. 2. The communication unit 35 may connect to a public communication network, for example, through a LAN, or may connect to the public communication network via a base station 25 through wireless communication such as a wireless LAN.

The camera 36 performs image pickup, for example, at predetermined periods and writes an image into a frame buffer (not illustrated). The image pickup rate of the camera 36 is, for example, 15 fps to 60 fps. The angle of view of the camera 36 may be fixed or may be variable within a predetermined range. Note that the hardware configuration of the fixed camera 30 illustrated in FIG. 9 is an example, and this is not restrictive.

Figure 10:
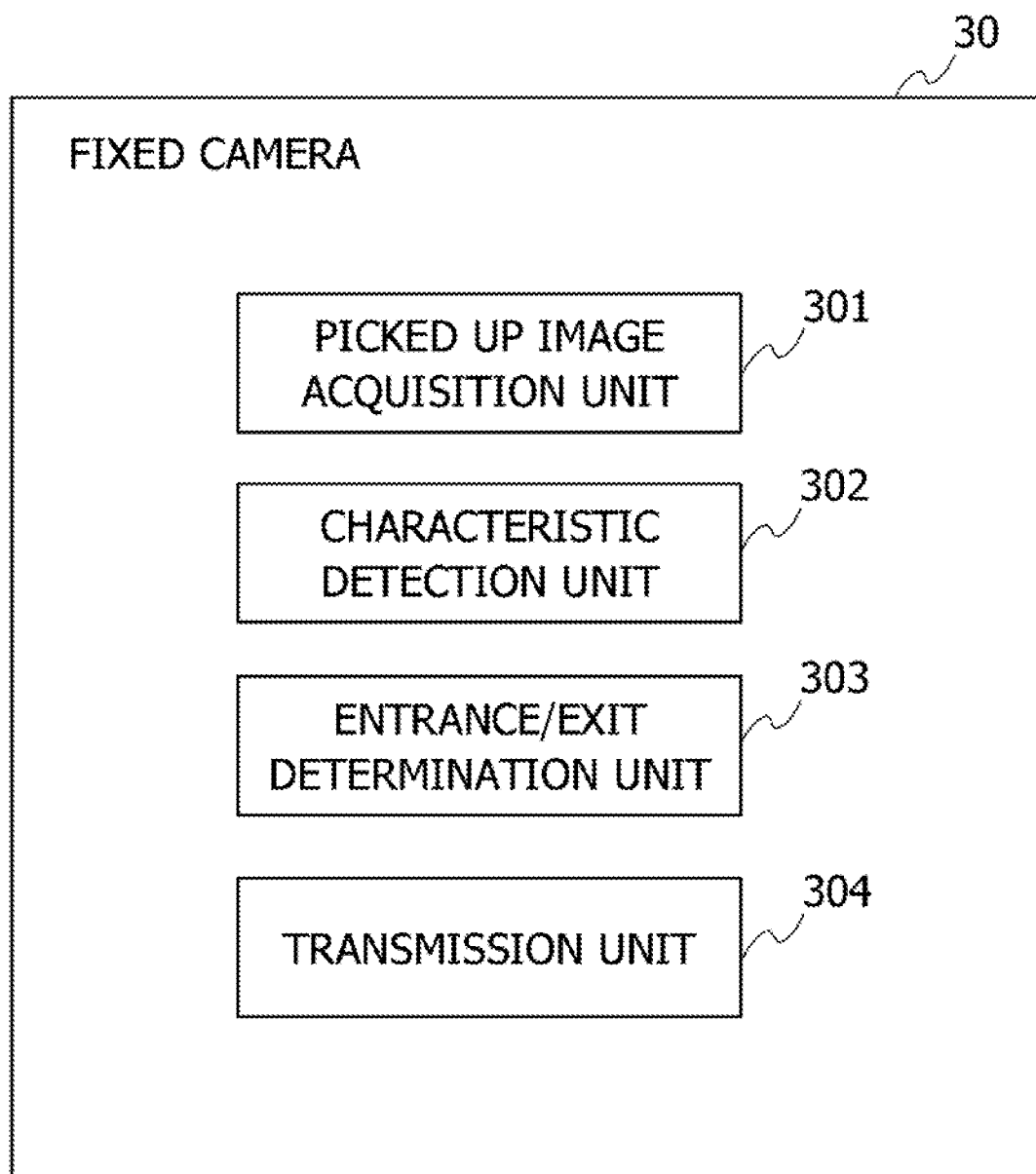
FIG. 10 is a diagram illustrating an example of a functional configuration of any one of the fixed cameras.

FIG. 10 is a diagram illustrating an example of a functional configuration of any one of the fixed cameras 30. The fixed camera 30 operates as each unit illustrated in FIG. 10 through a computer program on the memory. That is, the fixed camera 30 includes a picked up image acquisition unit 301, a characteristic detection unit 302, an entrance/exit determination unit 303, and a transmission unit 304, as functional constituent elements.

The picked up image acquisition unit 301 reads and acquires an image picked up by the camera 36 and written in the frame buffer or the like. The picked up image acquired by the picked up image acquisition unit 301 is outputted to the characteristic detection unit 302. The picked up image acquisition unit 301 acquires a time of day at which the image is acquired, as a timestamp.

The characteristic detection unit 302 receives an input of an image picked up by the camera 36 from the picked up image acquisition unit 301. The characteristic detection unit 302 analyzes the inputted image by a predetermined image processing method and detects vehicle characteristic information from the image. In the first embodiment, for vehicle characteristic information, the characteristic detection unit 302 extracts all information displayed on a license plate. A method of analyzing the image performed by the characteristic detection unit 302 is not limited to a specified method, and any method may be used. If the characteristic detection unit 302 detects vehicle characteristic information from the image, the characteristic detection unit 302 outputs the image to the entrance/exit determination unit 303.

The entrance/exit determination unit 303 receives an input of an image from which vehicle characteristic information is detected, from the characteristic detection unit 302. The entrance/exit determination unit 303 analyzes the inputted image and determines whether a vehicle corresponding to the detected vehicle characteristic information has entered or exited. The determination is performed, for example, based on a lane on which the vehicle is located, a face (for example, a front face or a back face, or the like) of the vehicle the image of which is picked up, or the like because the image pickup range of the fixed camera 30 is fixed to a road through which an area can be entered or exited.

For example, if the fixed camera 30 is installed toward an outside of the area of installation and if a vehicle detected from the picked up image is located on a right lane (in Japan) or if the front face of a vehicle appears, it is determined that the vehicle has entered the area of installation. For example, if the fixed camera is installed toward an outside of the area of installation and if a vehicle detected from the picked up image is located on a left lane (in Japan) or if the back face of a vehicle appears, it is determined that the vehicle has exited from the area of installation.

The entrance/exit determination unit 303 outputs the vehicle characteristic information detected from the image picked up by the camera 36 and information indicating entrance or exit to the transmission unit 304. The transmission unit 304 creates area entrance/exit reformation including the vehicle characteristic information detected from the image picked up by the camera 36 and the information indicating entrance or exit, which are inputted from the entrance/exit determination unit 303, and also including identification information on the fixed camera 30 and a timestamp, and sends the area entrance/exit information to a relevant edge server 20.

The picked up image acquisition unit 301 and the characteristic detection unit 302 perform processing, for example, at the image pickup rate of the camera 36. Note that in the first embodiment, it depends on differences in the image pickup rate whether the camera 36 picks up an image or picks up a video, and no difference is caused in the processing performed by the picked up image acquisition unit 301, the characteristic detection unit 302, and the entrance/exit determination unit 303, and therefore the description in FIGS. 9 and 10 uses "picked up image".

Figure 11:
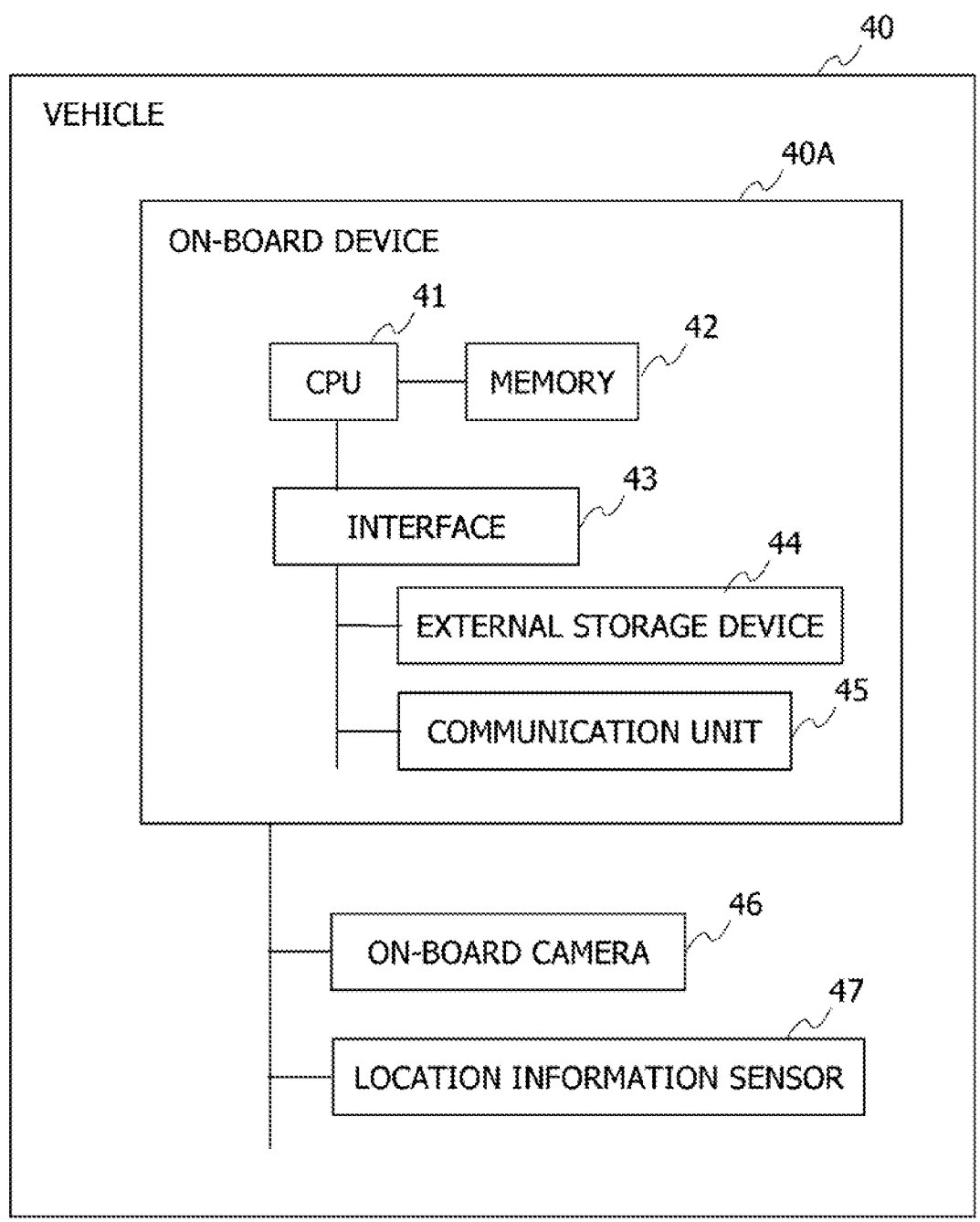
FIG. 11 is a diagram illustrating an example of a hardware configuration of any one of the vehicles mounted with the dedicated on-board device.

FIG. 11 is a diagram illustrating an example of a hardware configuration of any one of the vehicles 40 mounted with the dedicated on-board device. In FIG. 11, of the hardware configuration of the vehicle 40, components related to search assist are extracted and presented. The vehicle 40 includes an on-hoard device 40A, an on-board camera 46, and a location information sensor 47, as hardware constituent elements.

The on-board device 40A includes a CPU 41, a memory 42, an interface 43, an external storage device 44, and a communication unit 45. The external storage device 44 and the communication unit 45 are connected to the interface 43. Configurations and operations of the CPU 41, the memory 42, the interface 43, and the external storage device 44 are similar to the configurations and operations of the CPU 21, the memory 22, the interface 23, and the external storage device 24 in FIG. 2.

The communication unit 45 is a communication unit for communicating with the edge servers 20 and the center server 10, for example, via the base stations 25. The communication unit 45 performs wireless communication by using a wireless signal and a wireless communication scheme in conformity with a predetermined wireless communication standard.

The on-board camera 46 performs image pickup at a predetermined image pickup rate and writes a picked up image into a frame buffer. The on-board camera 46 is installed in such a manner that, for example, a traveling direction of the vehicle 40 is identical to an image pickup direction. For example, the angle of a lens of the on-board camera 46 may be changed in a horizontal direction within a predetermined angle.

The location information sensor 47 acquires location information on the vehicle 40 at predetermined periods. The location information sensor 47 is, for example, a Global Positioning System (GPS) reception unit. Note that a hardware configuration of each vehicle 50 is approximately similar to the hardware configuration of the vehicle 40 illustrated in FIG. 11.

Figure 12:
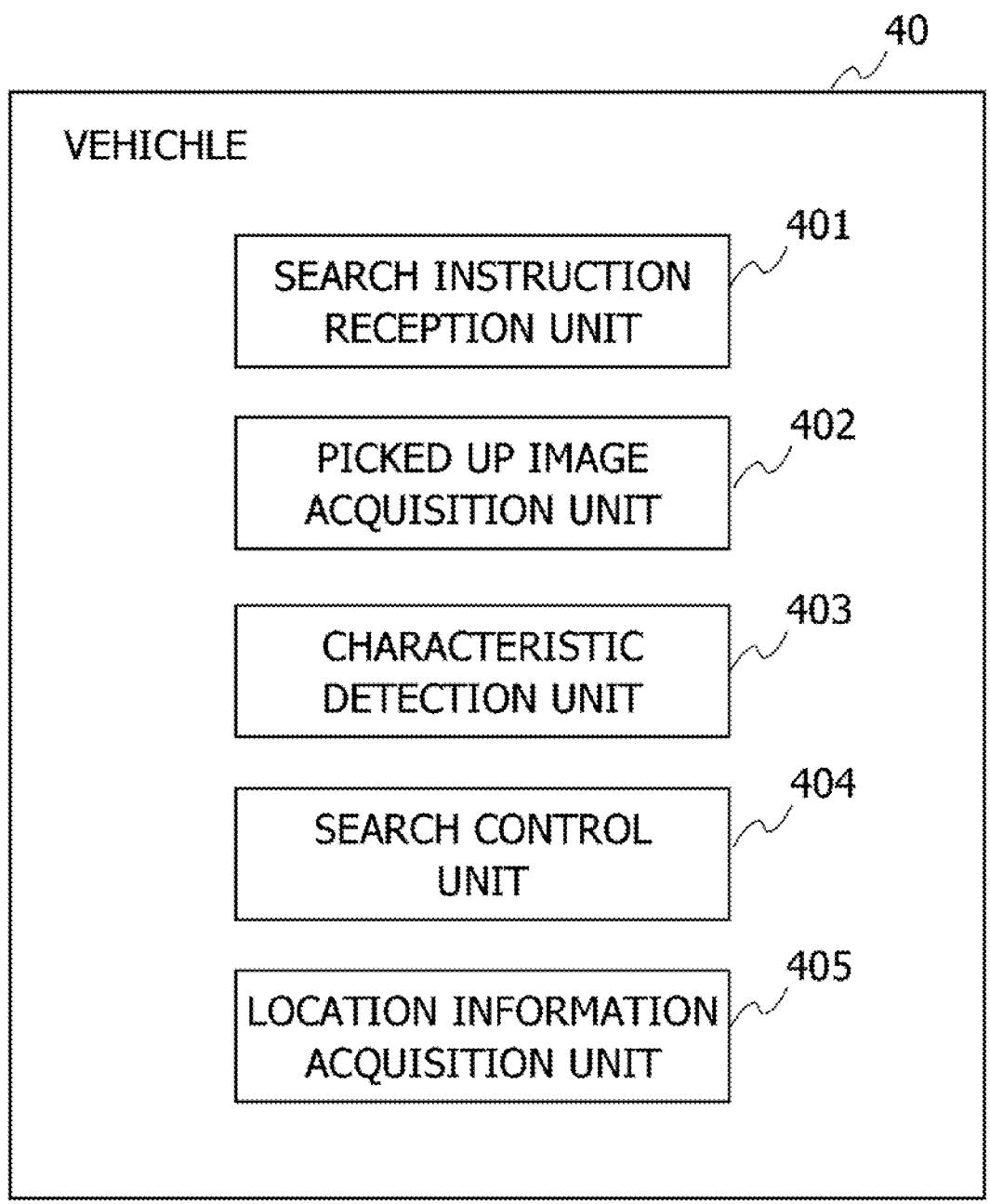
FIG. 12 is a diagram illustrating an example of a functional configuration of any one of the vehicles mounted with the dedicated on-board device.

FIG. 12 is a diagram illustrating an example of a functional configuration of any one of the vehicles 40 mounted with the dedicated on-board device. The vehicle 40 operates as each unit illustrated in FIG. 12 through a computer program on the memory. That is, the vehicle 40 includes a search instruction reception unit 401, a picked up image acquisition unit 402, a characteristic detection unit 403, a search control unit 404, and a location information acquisition unit 405, as functional constituent elements.

The search instruction reception unit 401 receives a search instruction from an edge server 20. Vehicle characteristic information on a subject-of-search vehicle is also received along with the search instruction. The search instruction reception unit 401, upon receiving the search instruction, activates the picked up image acquisition unit 402, the characteristic detection unit 403, and the search control unit 404.

The search instruction reception unit 401 receives a search completion notification from the edge server 20. The search instruction reception unit 401, upon receiving the search completion notification, outputs a stop instruction to the picked up image acquisition unit 402, the characteristic detection unit 403, and the search control unit 404.

The picked up image acquisition unit 402 reads and acquires an image picked up by the on-board camera 46 and written in the frame buffer or the like. The picked up image acquired by the picked up image acquisition unit 402 is outputted to the characteristic detection unit 403.

The characteristic detection unit 403 receives an input of an image picked up by the on-board camera 46 from the picked up image acquisition unit 402. The characteristic detection unit 403 analyzes the inputted image and detects vehicle characteristic information. In the first embodiment, the characteristic detection unit 403 detects a number of a vehicle from the image. A method of analyzing the image performed by the characteristic detection unit 403 is not limited to a specified method, and any method may be used. If the characteristic detection unit 403 detects vehicle characteristic information from the image, the characteristic detection unit 403 outputs the detected vehicle characteristic information to the search control unit 404.

The search control unit 404 receives an input of vehicle characteristic information detected from an image picked up by the on-board camera 46, from the characteristic detection unit 403. The search control unit 404 determines whether or not the inputted vehicle characteristic information matches vehicle characteristic information on a subject-of-search vehicle. If the inputted vehicle characteristic information matches the vehicle characteristic information on the subject-of-search vehicle, the search control unit 404 sends the image picked up by the on-board camera 46 to the center server 10 along with location information acquired by the location information acquisition unit 405, which will be described later.

The location information acquisition unit 405 acquires, at predetermined periods, location information on the vehicle 40 acquired by, for example, the location information sensor 47 and sends the location information to the center server 10. The location information on the vehicle 40 may be any of, for example, a latitude and a longitude, an address, and the like. The location information acquisition unit 405 stores the acquired location information on the vehicle 40 in the memory so that other processing units, for example, the search control unit 404 and the like can also use the location reformation on the vehicle 40.

The picked up image acquisition unit 402, the characteristic detection unit 403, and the search control unit 404 perform processing, for example, at the image pickup rate of the on-board camera 46. Note that in the first embodiment, it depends on differences in the image pickup rate whether the on-board camera 46 picks up an image or picks up a video, and no difference is caused in the processing performed by the picked up image acquisition unit 402, the characteristic detection unit 403, and the search control unit 404 and, therefore the description in FIGS. 11 and 12 uses "picked up image".

<Processing Flows>

Figure 13:
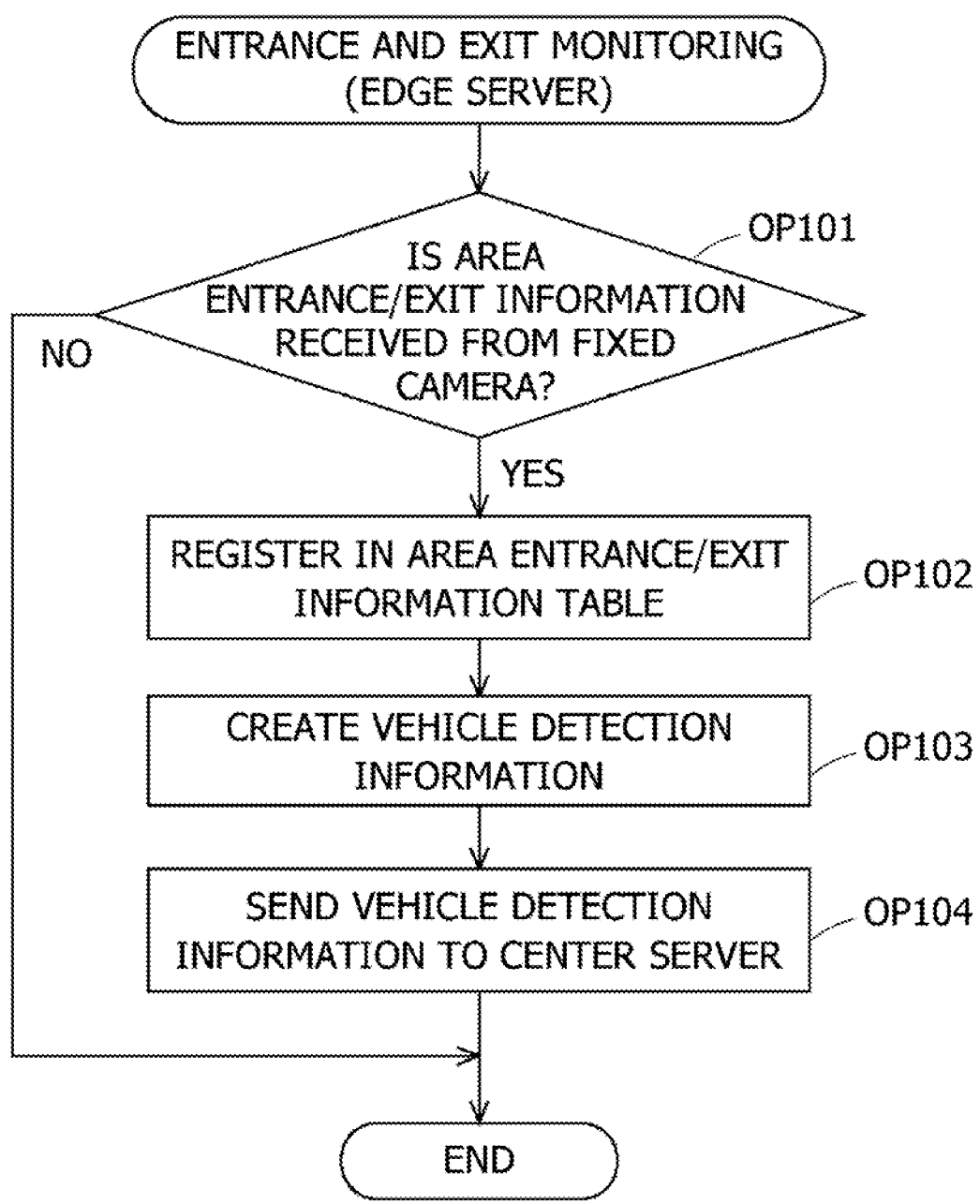
FIG. 13 is an example of a flowchart of entrance and exit monitoring processing at each edge server.

FIG. 13 is an example of a flowchart of entrance and exit monitoring processing at each edge server 20. The entrance and exit monitoring processing is processing of monitoring entrance of vehicles into and exit of vehicles from each own covered area, and one of the processing of monitoring a vehicle detection state in the search assist system 1. The processing illustrated in FIG. 13 is repeatedly performed, for example, at a predetermined period. Note that although an executing entity of the processing illustrated in FIG. 13 is the CPU 21 of each edge server 20, a description will be given assuming a functional constituent element as the entity, for convenience. Regarding flowcharts described below, although CPUs are executing entities similarly, a description will be given assuming functional constituent elements as the entities.

In OP 101, the fixed camera communication unit 201 determines whether or not area entrance/exit information is received from a fixed camera 30. If area entrance/exit information is received from a fixed camera 30 (OP 101: YES), the processing advances to OP 102. If no area entrance/exit information is received from a fixed camera 30 (OP 101: NO), the processing illustrated in FIG. 13 is terminated.

In OP 102, the fixed camera communication unit 201 registers the received area entrance/exit information in the area entrance/exit information table. In OP 103, the fixed camera communication unit 201 creates vehicle detection information including vehicle characteristic information, which is included in the received area entrance/exit information, identification information on the own edge server 20, and a timestamp. In OP 104, the fixed camera communication unit 201 sends the created vehicle detection information to the center server 10 via the center server transmission unit 202. Thereafter, the processing illustrated in FIG. 13 is terminated.

Figure 14:
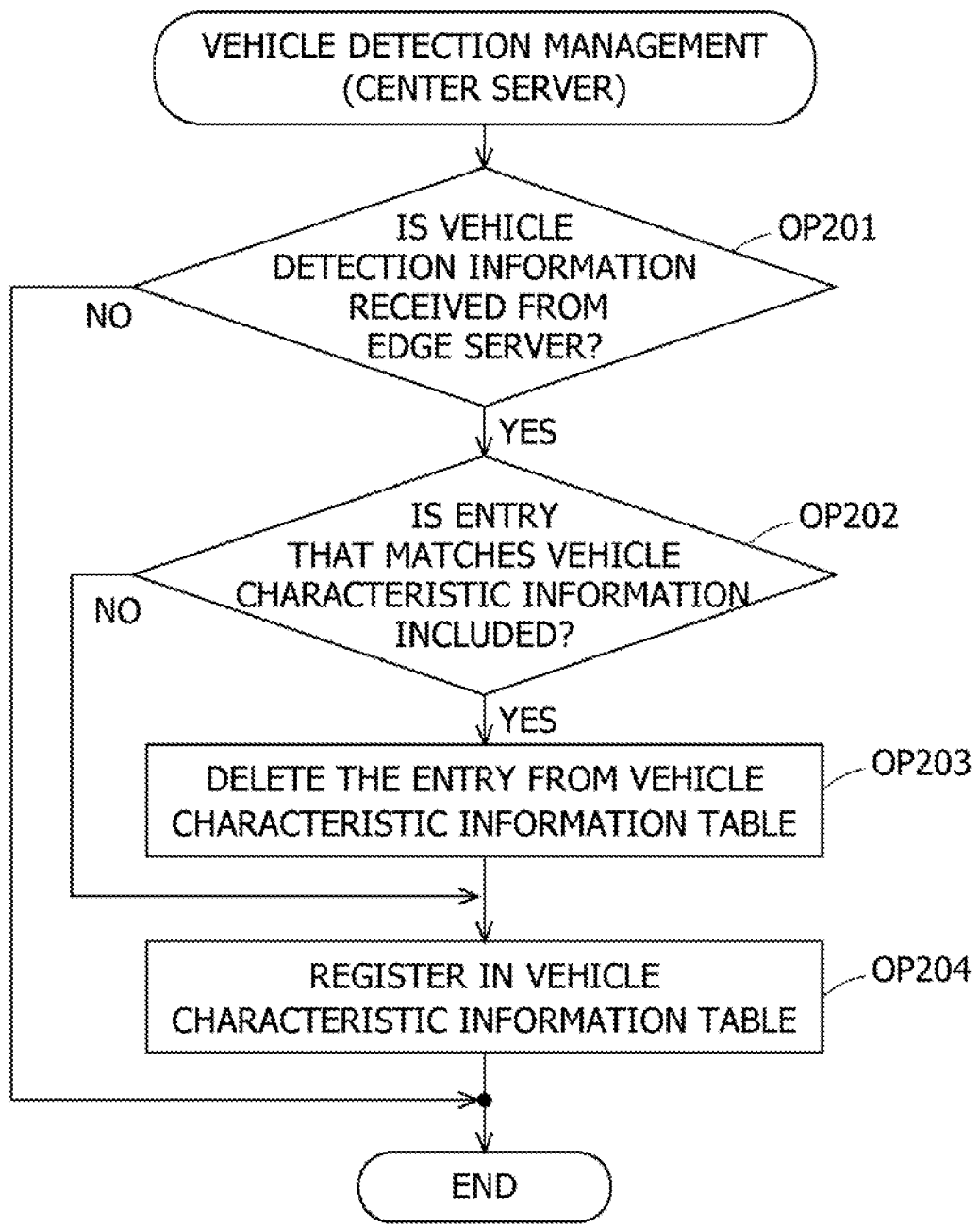
FIG. 14 is an example of a flowchart of vehicle detection management processing at the center server.

FIG. 14 is an example of a flowchart of vehicle detection management processing at the center server 10. The vehicle detection management processing is processing of monitoring vehicles that may be present in each area covered by each edge server 20. The vehicle detection management processing is one of the processing of monitoring a vehicle detection state in the search assist system 1. The processing illustrated in FIG. 14 is repeatedly performed, for example, at a predetermined period.

In OP 201, the fixed camera information acquisition unit 101 determines whether or not vehicle detection information is received from any one of the edge servers 20. The vehicle detection information includes vehicle characteristic information, identification information on the edge server 20, and a timestamp. If vehicle detection information is received (OP 201: YES), the processing advances to OP 202. If no vehicle detection information is received (OP 201: NO), the processing illustrated in FIG. 14 is terminated.

In OP 202, the fixed camera information acquisition unit 101 determines whether or not the vehicle detection information table includes an entry a value of which in the vehicle characteristic information field matches the vehicle characteristic information included in the received vehicle detection information. If the vehicle detection information table includes an entry a value of which in the vehicle characteristic information field matches the vehicle characteristic information included in the received vehicle detection information (OP 202: YES), the processing advances to OP 203. If the vehicle detection information table does not include an entry a value of which in the vehicle characteristic information field matches the vehicle characteristic information included in the received vehicle detection information (OP 202: NO), the processing advances to OP 204.

In OP 203, the fixed camera information acquisition unit 101 deletes the entry from the vehicle detection information table. In OP 204, the fixed camera information acquisition unit 101 registers the received vehicle detection information in the vehicle detection information table. Thereafter, the processing illustrated in FIG. 14 is terminated.

Figure 15:
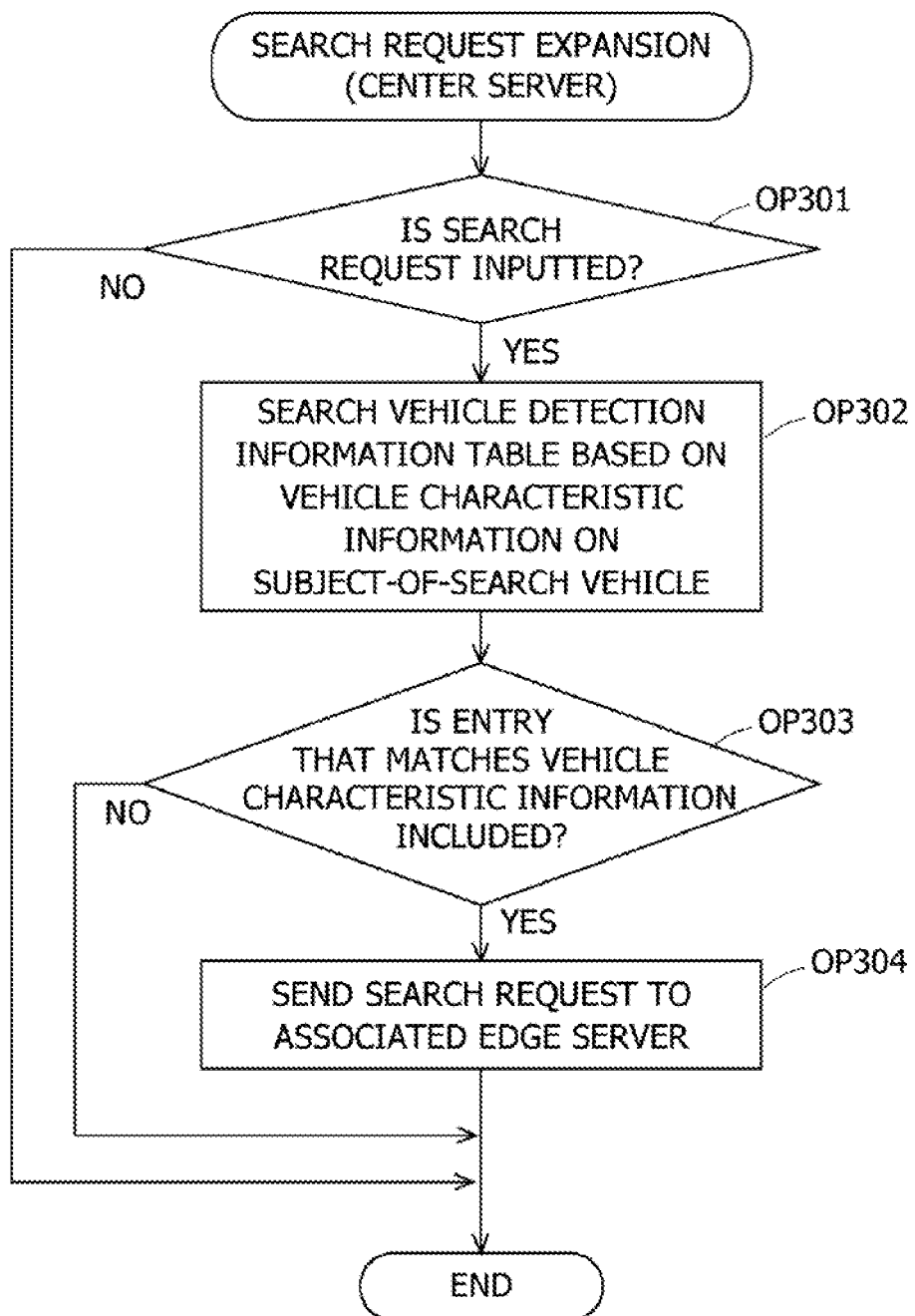
FIG. 15 is an example of a flowchart of search request expansion processing at the center server.

FIG. 15 is an example of a flowchart of search request expansion processing at the center server 10. The search request expansion processing at the center server 10 is processing of sending a search request to an edge server 20 when a search request is inputted from a searcher. The search request expansion processing at the center server 10 is one of processing included in the search processing in the search assist system 1. The processing illustrated in FIG. 15 is performed, for example, at a predetermined period.

In OP 301, the search request expansion unit 104 determines whether or not a search request is inputted from the search request input unit 103. If a search request is inputted (OP 301: YES), the processing advances to OP 302. If no search request is inputted (OP 301: NO), the processing illustrated in FIG. 15 is terminated.

In OP 302, the search request expansion unit 104 searches the vehicle characteristic information table, based on vehicle characteristic information on a subject-of-search vehicle, which is inputted along with the search request. In OP 303, the search request expansion unit 104 determines whether or not the vehicle detection information table includes an entry a value of which in the vehicle characteristic information field matches the vehicle characteristic information on the subject-of-search vehicle. If the vehicle detection information table includes an entry a value of which in the vehicle characteristic information field matches the vehicle characteristic information on the subject-of-search vehicle (OP 303: YES), the processing advances to OP 304. If the vehicle detection information table does not include an entry a value of which in the vehicle characteristic information field matches the vehicle characteristic information on the subject-of-search vehicle (OP 303: NO), the processing illustrated in FIG. 15 is terminated.

In OP 304, the search request expansion unit 104 sends a search request to an edge server 20 that is associated with the vehicle characteristic information in the entry a value of which in the vehicle characteristic information field matches the vehicle characteristic information on the subject-of-search vehicle in the vehicle detection information table. The vehicle characteristic information on the subject-of-search vehicle is also sent along with the search request. Note that for example, if the vehicle characteristic information on the subject-of-search vehicle is a full number displayed on a license plate, there is one entry a value of which in the vehicle characteristic information field matches the vehicle characteristic information on the subject-of-search vehicle in the vehicle detection information table, and there is also one edge server 20 that is a destination of the search request.

On the other hand, for example, if the vehicle characteristic information on the subject-of-search vehicle is part of a number displayed on a license plate, there may be a plurality of entries values of which in the vehicle characteristic information field match the vehicle characteristic information on the subject-of-search vehicle in the vehicle detection information table. In this case, there may be also a plurality of edge servers 20 that are destinations of the search request, and the search request expansion unit 104 may send a search request to the plurality of edge servers 20.

The vehicle detection information table stores latest information on each vehicle whose entrance into or from any one of the areas is detected. Accordingly, each edge server 20 that is a destination of the search request is an edge server 20 that may cover an area in which the subject-of-search vehicle may be present.

Figure 16:
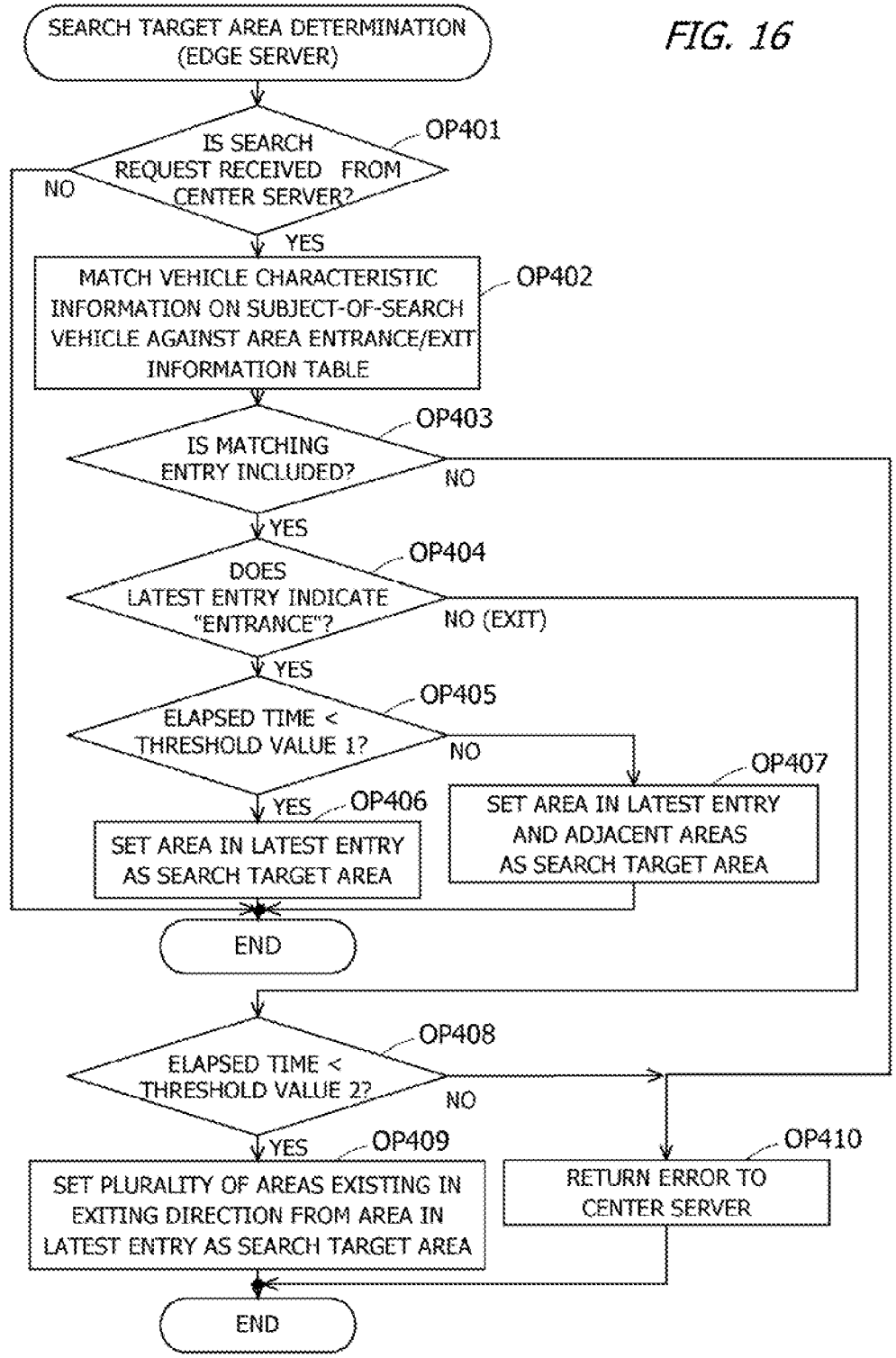
FIG. 16 is an example of a flowchart of search target area determination processing at each edge server.

FIG. 16 is an example of a flowchart of search target area determination processing at each edge server 20. The search target area determination processing is processing of determining a search target area for the subject-of-search vehicle. The search target area determination processing at each edge server 20 is one of processing included in the search processing in the search assist system 1. The processing illustrated in FIG. 16 is performed, for example, at a predetermined period.

In OP 401, the search target area determination unit 206 determines whether or not the search request reception unit 205 receives a search request from the center server 10. If a search request is received from the center server 10 (OP 401: YES), the processing advances to OP 402, if no search request is received from the center server 10 (OP 401: NO), the processing illustrated in FIG. 16 is terminated.

In OP 402, the search target area determination unit 206 matches vehicle characteristic information on a subject-of-search vehicle against the area entrance/exit information table. In OP 403, the search target area determination unit 206 determines whether or not the area entrance/exit information table includes an entry a value of which in the vehicle characteristic information field matches the vehicle characteristic information on the subject-of-search vehicle. If the area entrance/exit information table includes at least one matching entry (OP 403: YES), the processing advances to OP 404. Hereinafter, an entry a value of which in the vehicle characteristic information field matches the vehicle characteristic information on the subject-of-search vehicle in the area entrance/exit information table will be simply referred to as a subject-of-search vehicle entry.

If the area entrance/exit information table does not include a subject-of-search vehicle entry (OP 403: NO), the processing advances to OP 410. In OP 410, the search target area determination unit 206 returns an error to the center server 10 via the center server transmission unit 202. Thereafter, the processing illustrated in FIG. 16 is terminated.

In OP 404, the search target area determination unit 206 determines whether or not a value in the entrance/exit field of a latest entry of the at least one subject-of-search vehicle entry indicates entrance. If the latest subject-of-search vehicle entry indicates entrance (OP 404: YES), the processing advances to OP 405. If the latest subject-of-search vehicle entry indicates exit (OP 404: NO), the processing advances to OP 408.

OP 405 through OP 407 are processing in the case where the latest subject-of-search vehicle entry indicates entrance. In OP 405, the search target area determination unit 206 determines whether or not elapsed time since a time of day indicated in the timestamp field of the latest subject-of-search vehicle entry, that is, since the subject-of-search vehicle entered an area indicated by the latest entry is shorter than a threshold value 1. The threshold value 1 is set, for example, by the hour, by the day, or by the week.

If the elapsed time since the subject-of-search vehicle entered the area indicated by the latest entry is shorter than the threshold value 1 (OP 405: YES), the processing advances to OP 406. In OP 406, the search target area determination unit 206 sets the area indicated by the latest entry as a search target area. That is, in the processing illustrated in FIG. 16, it the latest subject-of-search vehicle entry indicates entrance and if the elapsed time since the subject-of-search vehicle entered the area is shorter than the threshold value 1, it is determined that it is highly probable that the subject-of-search vehicle is present in the area, and the area is set as a search target area. Thereafter, the processing illustrated in FIG. 16 is terminated.

If the elapsed time since the subject-of-search vehicle entered the area indicated by the latest entry is equal to or longer than the threshold value 1 (OP 405: NO), the processing advances to OP 407. In OP 407, the search target area determination unit 206 sets the area indicated by the latest entry and adjacent areas as a search target area. The adjacent areas to the area indicated by the latest entry are acquired, for example, from the area management information stored in the map information storage unit 204. That is, in the processing illustrated in FIG. 16, if the latest subject-of-search vehicle entry indicates entrance and if the elapsed time since the subject-of-search vehicle entered the area is equal to or longer than the threshold value 1, it is determined that it is highly probable that the subject-of-search vehicle present in the area or has exited the area through a road along which no fixed camera 30 is installed. Accordingly, the area and the adjacent areas are set as a search target area. Thereafter, the processing illustrated in FIG. 16 is terminated.

OP 408 through OP 410 are processing in the case where the latest subject-of-search vehicle entry indicates exit. In OP 408, the search target area determination unit 206 determines whether or not elapsed time since a time of day indicated in the timestamp field of the latest subject-of-search vehicle entry, that is, since the subject-of-search vehicle exited an area indicated by the latest entry is shorter than a threshold value 2. The threshold value 2 is set, for example, by the hour, by the day, or by the week. The threshold value 2 may be the same value as, or may be a different value from, the threshold value 1.

If the elapsed time since the subject-of-search vehicle exited the area indicated by the latest entry is shorter than the threshold value 2 (OP 408: YES), the processing advances to OP 409. In OP 409, the search target area determination unit 206 sets a plurality of areas existing in an exiting directing from the area indicated by the latest entry as a search target area. That is, in the processing illustrated in FIG. 16, if the latest subject-of-search vehicle entry indicates exit and if the elapsed time since the subject-of-search vehicle exited the area is shorter than the threshold value 2, it is determined that it is highly probable that the subject-of-search vehicle is present in areas existing in the exiting direction from the area, among areas around the area, and the areas existing in the exiting direction from the area are set as a search target area. The areas around the area are, for example, areas falling within a range from the adjacent areas up to a predetermined number of areas away from the area in all directions centering on the area.

The exiting direction of the vehicle is acquired, for example, from an installation location of a fixed camera 30 indicated by the latest subject-of-search vehicle entry. The installation location of the fixed camera 30 is acquired, for example, from the fixed camera management information held in the map information storage unit 204. The areas exiting in the exiting direction of the vehicle are acquired, for example, from the area management information stored in the map information storage unit 204. Thereafter, the processing illustrated in FIG. 16 is terminated.

If the elapsed time since the subject-of-search vehicle exited the area indicated by the latest entry is equal to or longer than the threshold value 2 (OP 408: NO), the processing advance to OP 410. In OP 410, the search target area determination unit 206 returns an error to the center server 10 via the center server transmission unit 202. This is because if the latest subject-of-search vehicle entry indicates exit and if the elapsed time since the subject-of-search vehicle exited the area is equal to or longer than the threshold value 2, it is determined that whereabouts of the subject-of-search vehicle is unknown. However, in this case, the search target area determination unit 206 may send information in the latest subject-of-search vehicle entry to the center server 10 along with the error. Thereafter, the processing illustrated in FIG. 16 is terminated.

In the search target area determination processing illustrated in FIG. 16, for example, an area around which no fixed camera 30 is installed, around the area indicated by the latest subject-of-search vehicle entry, can be also included in a search target area (for example, OP 407, OP 409). Thus, a searchable range of the search assist system 1 is widened, and probability of capturing the subject-of-search vehicle can be increased.

Note that the processing illustrated in FIG. 16 is an example, and a method of determining a search target area is not limited to the method illustrated in FIG. 16. For example, a search target area does not need to be determined in a unit of a management area. For example, a search target area may be determined in such a manner that as elapsed time since a time of day indicated by a latest subject-of-search vehicle entry becomes longer, a range centering on an installation location of a fixed camera 30 indicted by the entry becomes wider.

Figure 17:
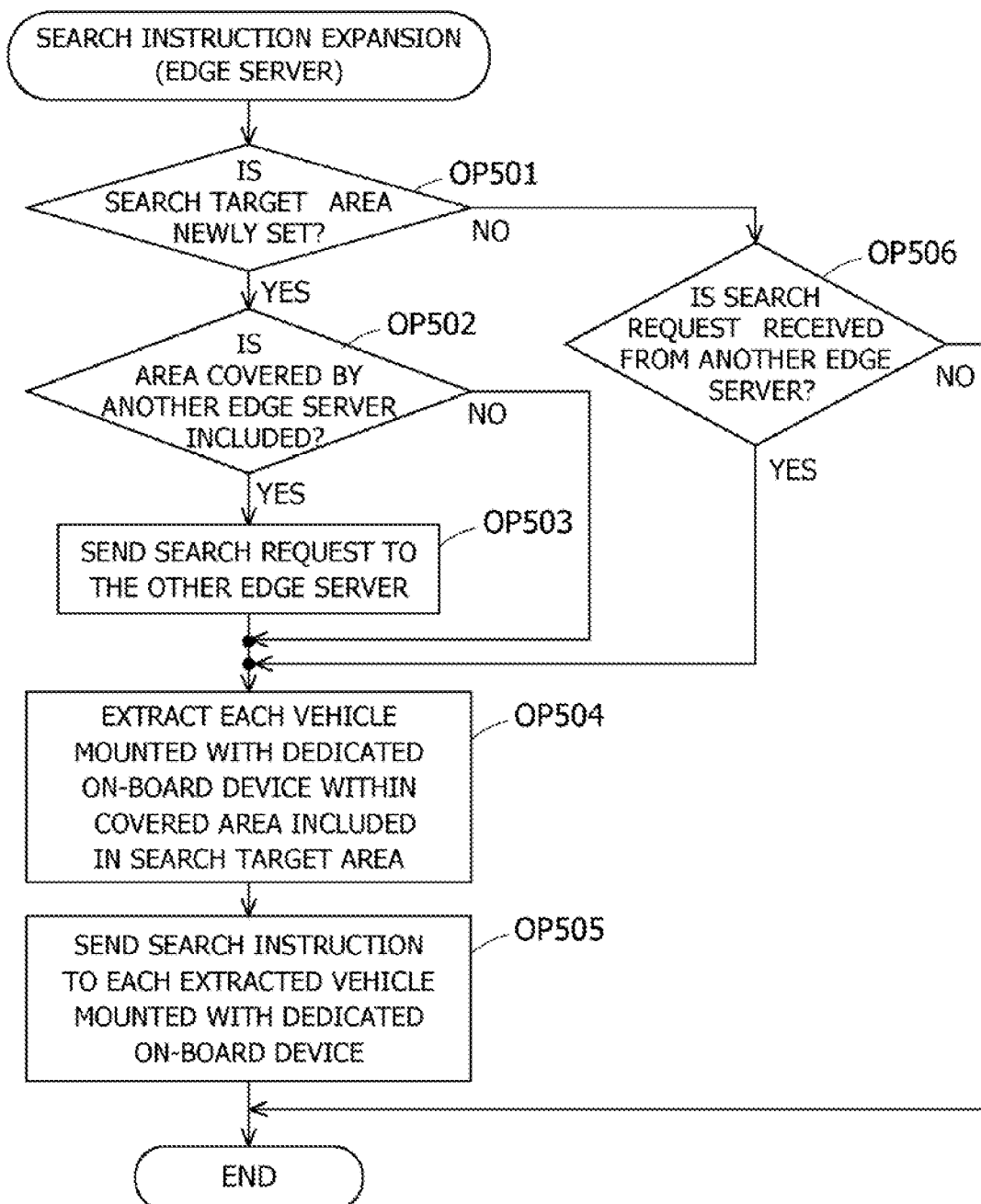
FIG. 17 is an example of a flowchart of search instruction expansion processing at each edge server.

FIG. 17 is an example of a flowchart of search instruction expansion processing at each edge server 20. The search instruction expansion processing is processing of sending a search instruction to each vehicle 40 within a search target area determined through the search target area determination processing, and is processing performed subsequent to the search target area determination processing. The search instruction expansion processing at each edge server 20 is one of processing included in the search processing in the search assist system 1. The processing illustrated in FIG. 17 is performed, for example, at a predetermined period.

In OP 501, the search instruction expansion unit 207 determines whether or not a search target area is newly set by the search target area determination unit 206. If a search target area is newly set (OP 501: YES), the processing advances to OP 502. If a search target area is not newly set (OP 501: NO), the processing advances to OP 506.

Processing in OP 502 through OP 505 is processing in the case where a search target area is newly set. In OP 502, the search instruction expansion unit 207 determines whether or not the search target area includes an area covered by another edge server 20. If the search target area includes an area covered by another edge server 20 (OP 502: YES), the processing advances to OP 503. If the search target area does not include an area covered by another edge server 20 (OP 502: NO), the processing advance to OP 504.

In OP 503, the search instruction expansion unit 207 sends a search request to the other edge server 20 that covers the area included in the search target area. Identification information on the area covered by the other edge server 20 that is included in the search target area and the vehicle characteristic information on the subject-of-search vehicle are also sent along with the search request.

In OP 504, the search instruction expansion unit 207 extracts each vehicle 40 mounted with the dedicated on-board device that is present within an area covered by the own edge server 20 that is included in the search target area, based on the vehicle management information table stored in the map information storage unit 204. In OP 505, the search instruction expansion unit 207 sends a search instruction to each vehicle 40 mounted with the dedicated on-board device extracted in OP 504. The vehicle characteristic information on the subject-of-search vehicle is also sent along with the search instruction. Thereafter, the processing illustrated in FIG. 17 is terminated.

In OP 506, the search instruction expansion unit 207 determines whether or not the search request reception unit 205 receives a search request from another edge server 20. If a search request is received from another edge server 20 (OP 506: YES), the processing advances to OP 504, and a search instruction is sent to each vehicle 40 within an own covered area included in a search target area (OP 504, OP 505). If no search request is received from another edge server 20 (OP 506: NO), the processing illustrated in FIG. 17 is terminated.

Figure 18:
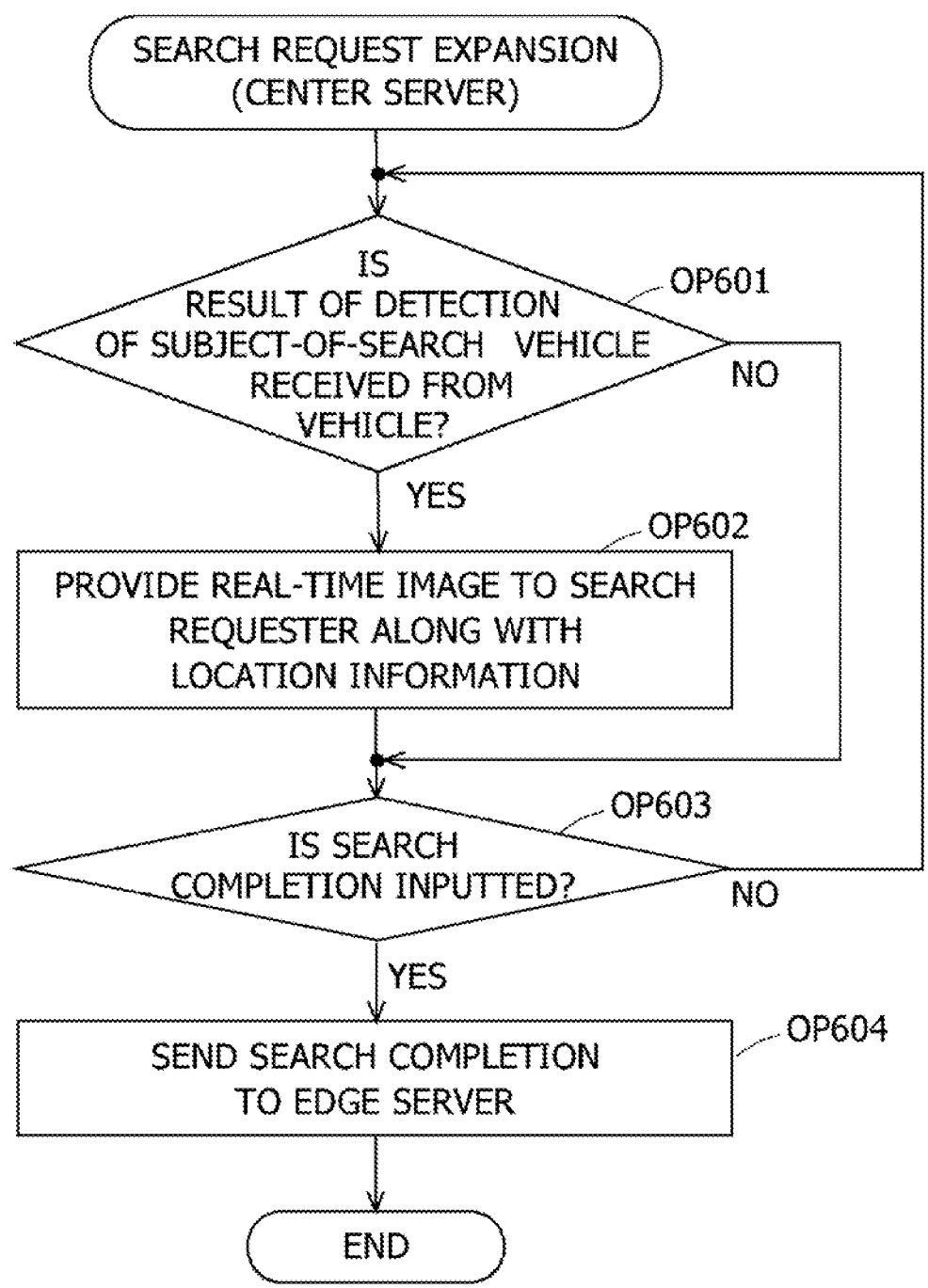
FIG. 18 is an example of a flowchart of search completion expansion processing at the center server.

FIG. 18 is an example of a flowchart of search completion expansion processing at the center server 10. The search completion expansion processing at the center server 10 is processing of detecting completion of search for a vehicle and sending the completion of search to an edge server 20. The search completion expansion processing at the center server 10 is one of processing included in the search processing in the search assist system 1. The processing illustrated in FIG. 18 is started, for example, when the search request expansion processing illustrated in FIG. 15 is terminated.

In OP 601, the search result reception unit 105 determines whether or not a result of detection of the subject-of-search vehicle is received from a vehicle 40 or a vehicle 50. In the first embodiment, for the result of detection of the subject-of-search vehicle, a real-time image or video obtained by the on-board camera and location information are received from a vehicle 40 or a vehicle 50. If a result of detection of the subject-of-search vehicle is received from a vehicle 40 or a vehicle 50 (OP 601: YES), the processing advances to OP 602. If no result of detection of the subject-of-search vehicle is received from a vehicle 40 or a vehicle 50 (OP 601: NO), the processing advances to OP 603.

In OP 602, the search result reception unit 105 outputs the real-time image or video obtained by the on-board camera and the location information received from the vehicle 40 or the vehicle 50 to the searcher via the search result output unit 106.

In OP 603, the search result reception unit 105 determines whether or not a search completion is inputted from the searcher via the search request input unit 103. If a search completion is inputted (OP 603: YES), the processing advances to OP 604. If no search completion is inputted (OP 603: NO), the processing advances to OP 601, and processing is repeated again from OP 601.

In OP 604, the search result reception unit 105 sends a search completion notification to the edge server 20 to which the search request has been sent, via the search request expansion unit 104. The vehicle characteristic information on the subject-of-search vehicle may be also sent along with the search completion notification. Thereafter, the processing illustrated in FIG. 18 is terminated.

Figure 19:
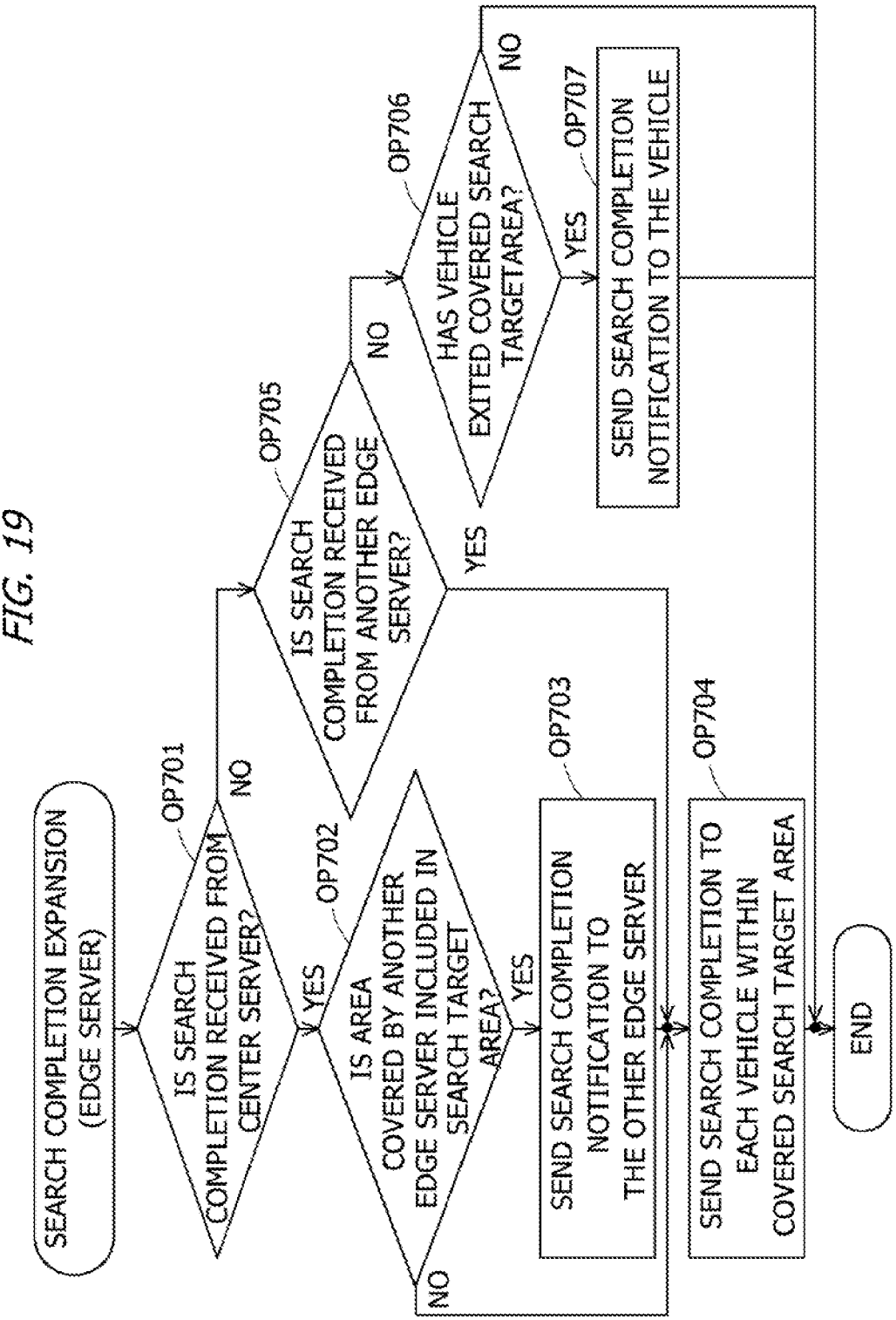
FIG. 19 is an example of a flowchart of search completion expansion processing at each edge server.

FIG. 19 is an example of a flowchart of search completion expansion processing at each edge server 20. The search completion expansion processing at each edge server 20 is processing of receiving completion of search for a vehicle from the center server 10 and sending a search completion notification to each vehicle 40 within the search target area and another edge server 20. The search completion expansion processing at each edge server 20 is one of processing included in the search processing in the search assist system 1. The processing illustrated in FIG. 19 is repeatedly performed, for example, at a predetermined period.

In OP 701, the search instruction expansion unit 207 determines whether or not a search completion notification received from the center server 10 via the search request reception unit 205. If a search completion notification is received from the center server 10 (OP 701: YES), the processing advances to OP 702. If no search completion notification is received from the center server 10 (OP 701: NO), the processing advances to OP 705.

Processing in OP 702 through OP 704 is processing in the case where a search completion notification is received from the center server 10. In OP 702, the search instruction expansion unit 207 determines whether or not the search target area includes an area covered by another edge server 20. If the search target area includes an area covered by another edge server 20 (OP 702: YES), the processing advances to OP 703. If the search target area does not include an area covered by another edge server 20 (OP 702: NO), the processing advances to OP 704.

In OP 703, the search instruction expansion unit 207 sends a search completion notification to the other edge server 20 that covers the area included in the search target area, that is, the other edge server 20 to which a search request has been sent. The vehicle characteristic information on the subject-of-search vehicle may be also sent along with the search completion notification.

In OP 704, the search instruction expansion unit 207 sends a search completion notification to each vehicle 40 mounted with the dedicated on-board device that is present within an area covered by the own edge server 20 that is included in the search target area, based on the vehicle management information table stored in the map information storage unit 204. The vehicle characteristic information on the subject-of-search vehicle may be also sent along with the search completion notification. Thereafter, the processing illustrated in FIG. 19 is terminated.

In OP 705, the search instruction expansion unit 207 determines whether or not the search request reception unit 205 receives a search completion notification from another edge server 20. If a search completion notification is received from another edge server 20 (OP 705: YES), the processing advances to OP 704, and a search completion notification is sent to each vehicle 40 within an own covered area included in the search target area (OP 704). If no search completion notification is received from another edge server 20 (OP 705: NO), the processing advances to OP 706.

In OP 706, the search instruction expansion unit 207 determines whether or not a vehicle 40 has exited the search target area covered by the own edge server 20. The determination is performed, for example, based on area entrance/exit information from own covered fixed cameras 30 and the area entrance/exit information table.

If a vehicle 40 has exited the search target area covered by the own edge server 20 (OP 706: YES), the processing advances to OP 707. In OP 707, the search instruction expansion unit 207 sends a search completion notification to the vehicle 40. Thereafter, the processing illustrated in FIG. 19 is terminated.

If no vehicle 40 has exited the search target area covered by the own edge server 20 (OP 706: NO) the processing illustrated in FIG. 19 is terminated.

In the search completion expansion processing illustrated in FIG. 19, an edge server 20 sends a search completion notification to a vehicle 40 if the vehicle 40 has exited a search target area that is covered by the edge server 20, in addition to if a search completion notification is received from the center server 10 or another edge server 20. Thus, the vehicle 40 that has exited the search target area can finish searching for the subject-of-search vehicle. However, this is not restrictive, and information on the search target area may be notified to the vehicle 40 along with a search instruction, and the vehicle 40 may finish searching for the vehicle upon detecting by itself that the vehicle 40 has exited the search target area based on the own location information.

Figure 20:
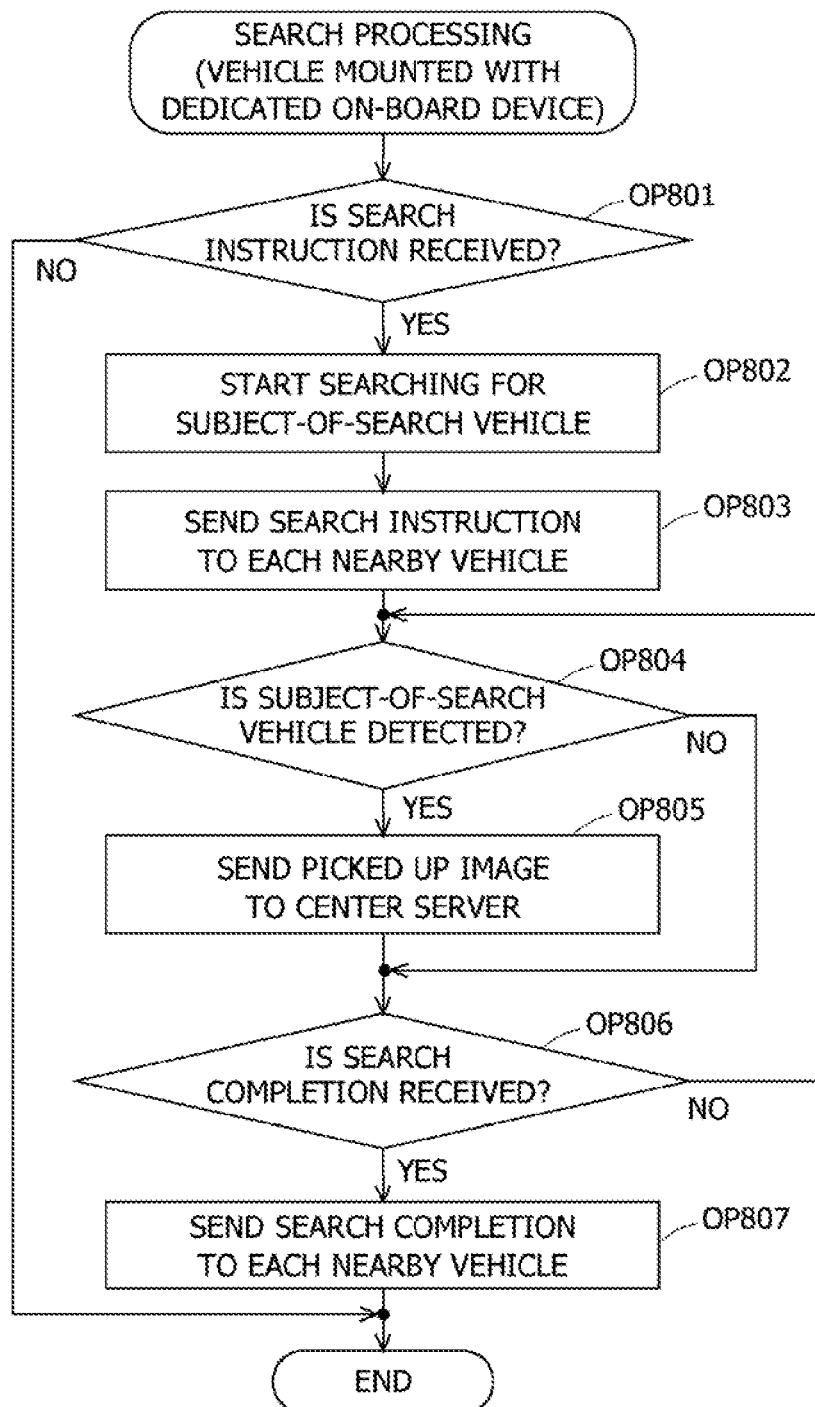
FIG. 20 is an example of a flowchart of search processing at each vehicle mounted with the dedicated on-board device.

FIG. 20 is an example of a flowchart of search processing at each vehicle 40 mounted with the dedicated on-board device. The search processing at each vehicle 40 is one of processing included in the search. Processing in the search assist system 1. The processing illustrated in FIG. 20 is repeatedly performed, for example, at a predetermined period.

In OP 801, the search control unit 404 determines whether or not a search instruction is received by the search instruction reception unit 401. If a search instruction is received (OP 801: YES), the processing advances to OP 802. If no search instruction is received (OP 801: NO), the processing illustrated in FIG. 20 is terminated.

In OP 802, the search control unit 404 starts searching for a subject-of-search vehicle. Specifically, in OP 802, the search control unit 404 activates, for example, the on-board camera 46, and the picked up image acquisition unit 402 and the characteristic detection unit 403 start processing.

In OP 803, the search control unit 404 sends a search instruction to each vehicle 50 mounted with no dedicated on-board device that is present nearby. In OP 803, for example, the search instruction is sent by vehicle-to-vehicle communication.

In OP 804, the search control unit 404 determines whether or not the subject-of-search vehicle is detected from an image picked up by the on-board camera 46. If the subject-of-search vehicle is detected (OP 804: YES), the processing advances to OP 805. If the subject-of-search vehicle is not detected (OP 804: NO), the processing advances to OP 806.

In OP 805, the search control unit 404 sends the image picked up by the on-board camera 46 and location information to the center server 10.

In OP 806, the search control unit 404 determines whether or not a search completion notification is received by the search instruction reception unit 401. If a search completion notification is received (OP 806: YES), the processing advances to OP 807. If no search completion notification is received (OP 806: NO), the processing advances to OP 804.

In OP 807, the search control unit 404 sends a search completion notification to each vehicle 50 mounted with no dedicated on-board device that is present nearby, for example, by vehicle-to-vehicle communication. For example, the search control unit 404 continues sending the search completion notification for a predetermined time period by vehicle-to-vehicle communication, and thereafter the processing illustrated in FIG. 20 is terminated.

<Operations and Effects of the First Embodiment>

In the first embodiment, a search target area is narrowed down to an area into which entrance of a subject-of-search vehicle, or from which exit of a subject-of-search vehicle, is recorded, or to areas around the area. Thus, in the search assist system 1, images to be subjected to image analysis processing for detecting the subject-of-search vehicle are limited to images picked up by on-board cameras within the search target area, and the amount of data to be searched can be reduced. As the amount of data to be searched is reduced, processing loads in the whole search assist system 1 are also reduced, and it is probable that time spent before the subject-of-search vehicle is found is shortened.

Generally, image quality of on-board cameras is poorer than image quality of fixed cameras 30 in many cases. Since detection of entrance of vehicles into or exit of vehicles from each area is performed using images picked up by the fixed cameras 30 in the first embodiment, vehicle characteristic information on the vehicles that enter or exit each area can be acquired more reliably, and a search target area can be narrowed down more accurately.

Even with relatively less reliable vehicle characteristic information derived from art image picked up by an on-board camera, which offers relatively poor image quality, the probability is increased that vehicle characteristic information on the subject-of-search vehicle matches the vehicle characteristic information detected from the image picked up by the on-board camera, by narrowing down a search target area. Accordingly, a vehicle detected from the image picked up by the on-board camera can be presumed to be the subject-of-search vehicle.

For example, even if partial information, such as just the last four digits of a number displayed on a license plate, is inputted as vehicle characteristic information on a subject-of-search vehicle, the search assist system 1 according to the first embodiment can narrow down a search target area, based on an installation location of a fixed camera 30 that detects vehicle characteristic information that matches the partial information. Thus, the search assist system 1 according to the first embodiment probably can identify a location of the subject-of-search vehicle even if the vehicle characteristic information on the subject-of-search vehicle is less reliable information.

In the first embodiment, the fixed cameras 30 by which vehicle characteristic information is detected are fixed cameras 30 installed on roadsides of roads through which each area can be entered and exited. Thus, the amount of image data or the amount of video data of the fixed cameras 30 handled in the search assist system 1 as a whole can be suppressed. However, the fixed cameras 30 by which vehicle characteristic information is detected are not limited to fixed cameras 30 installed on roadsides of roads through which each area can be entered and exited. For example, vehicle characteristic information can be detected by all fixed cameras 30 installed in each area.

In the first embodiment, entrance of each vehicle into or exit of each vehicle from each area detected from an image picked up by a fixed cameras 30 is recorded, whereby information about a movement direction of a subject-of-search vehicle can be acquired, and a search target area can be set more accurately. Setting a search target area more accurately means that it is highly probable that the subject-of-search vehicle is present within an area or areas set as a search target area.

In the first embodiment, if information indicating entrance into or exit from a predetermined area is recorded in association with vehicle characteristic information on a subject-of-search vehicle, areas around the area are included in a search target area in some cases. Thus, even an area that has no fixed camera 30 on roadsides of a road through which the area can be entered and exited can be included in a search target area. For example, even if the subject-of-search vehicle has exited the predetermined area through a road along which no fixed camera 30 is installed, there is a possibility that the subject-of-search vehicle can be captured.

<Others>

In the first embodiment, although each edge server 20 determines a search target area, this is not restrictive. The search target area determination processing may be performed by, for example, the center server 10 or each fixed camera 30. If the center server 10 performs the search target area determination processing, for example, the center server 10 holds the area entrance/exit information table, which is included in each edge server 20 in the first embodiment, for each one of the covered edge servers 20. When a search request is inputted, for example, the center server 10 determines a search target area by performing the processing illustrated in FIG. 16 and sends a search request to an edge server 20 that covers the search target area along with information on the search target area. The edge server 20, upon receiving the search request from the center server 10, sends a search instruction to each vehicle 40 under the search target area.

If each fixed camera 30 performs the search target area determination processing, for example, each fixed camera 30 holds area entrance/exit information on a vehicle that is detected by the fixed camera 30 itself and has entered or exited an area around which the fixed camera 30 is installed. For example, the center server 10 sends a search request to an edge server 20 as in the first embodiment, and the edge server 20 sends a search request to all own covered fixed cameras 30. Each fixed camera 30, upon receiving the search request, for example, determines a search target area by performing the processing illustrated in FIG. 16 against the information on entrance of vehicles into and exit of vehicles from the area, which is held by the fixed camera 30 itself, and sends a search instruction to each vehicle 40 that is present under the search target area. However, the search target area in this case is not determined in a unit of a management area, but is determined in a range centering on an installation location of the fixed camera 30.

In the first embodiment, detection of vehicle characteristic information from a picked up image is performed by each fixed camera 30 or each on-board camera itself. However, this is not restrictive, and detection of vehicle characteristic information from a picked up image may be performed by, for example, each edge server 20.

In the first embodiment, a description is given by using a vehicle as an example of a subject of search and a subject of identification from a picked up image. However, a subject of search and a subject of identification from a picked up image are not limited to a vehicle. For example, if a subject of search and a subject of identification from a picked up image is a person, characteristic information about a human external visual characteristic obtained from a picked up image through image processing is used, instead of vehicle characteristic information. The characteristic information about a human external visual characteristic is information on, for example, a gender, a height, a generation, clothes, a hairstyle, and the like.

If the vehicles 40 and the vehicles 50 are vehicles capable of autonomous cruising, the center server 10 may instruct a vehicle 40 or a vehicle 50 to track a subject-of-search vehicle when a picked up image from which vehicle characteristic information on the subject-of-search vehicle is detected is received from the vehicle 40 or the vehicle 50 as a result of search.

<Recording Medium>

A program that causes a computer or another machine or device (hereinafter, a computer or the like) to implement the processing by the center server 10, the edge server 20, the fixed camera 30, or the vehicle 40 described above can be recorded in a computer—or the like-readable recording medium. By causing a computer or the like to read and execute the program in the recording medium, the computer functions as the center server 10, the edge server 20, the fixed camera 30, or the vehicle 40 described above.

Here, the recording medium that can be read by the computer or the like refers to a non-transitory recording medium that can store information such as data and/or programs by means of electrical, magnetic, optical, mechanical or chemical action and can be read from the computer or the like. From among such recording mediums, ones that can be removed from the computer or the like include, for example, a flexible disk, a magnetooptical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a BOB (read-only memory). Furthermore, an SSD (solid state drive) can be used as either a recording medium that can be removed from the computer or the like or a recording medium fixed to the computer or the like.

What is claimed is:

1. A search assist system comprising:
    a first storage configured to store characteristic information on one or more subjects of identification detected from images or videos picked up by one or more fixed cameras installed at predetermined locations, respectively, and information about the one or more fixed cameras;
    a second storage configured to store location information on a plurality of vehicles each of which has an on-board camera;
    one or more first controllers configured to:
    receive characteristic information on a subject of search;
    determine a search target area based on information, stored in the first storage, about a fixed camera among the one or more fixed cameras that has picked up an image or a video from which characteristic information on a subject among the one or more subjects of identification matching at least part of the characteristic information on the subject of search is detected; and
    send, to each vehicle that is present within the search target area, a search instruction to search for the subject of search by using the on-board camera; and
    a second controller configured to output an image or a video picked up by the on-board camera from which first characteristic information matching at least part of the characteristic information on the subject of search is detected.

2. The search assist system according to claim 1, wherein a moving object or a person is the subject of search and the one or more subjects of identification,
    each of the one or more fixed cameras is installed at a boundary of each of a plurality of areas,
    the one or more first controllers detect, from an image or a video picked up by a first fixed camera installed for a first area, that a first subject of identification has entered the first area,
    the first storage stores an association among the characteristic information on the first subject of identification, identification information on the first area as the information about the first fixed camera, and information indicating entrance into the first area, and
    when the first storage stores the first characteristic information matching at least part of the characteristic information on the subject of search and when the first characteristic information is associated with the information indicating entrance into the first area,
    the one or more first controllers determine the first area associated with the first characteristic information as the search target area.

3. The search assist system according to claim 2, wherein the first storage stores an association among the characteristic information on the first subject of identification, the identification information on the first area as the information about the first fixed camera, the information indicating entrance of the first subject of identification into the first area, and a time of day of the entrance of the first subject of identification into the first area, and
    when the first storage stores the first characteristic information, when the first characteristic information is associated with the information indicating entrance into the first area, and when elapsed time since the time of day of the entrance into the first area is shorter than a predetermined threshold value, the one or more first controllers determine the first area associated with the first characteristic information as the search target area, and
    when the first storage stores the first characteristic information, when the first characteristic information is associated with the information indicating entrance into the first area, and when the elapsed time since the time of day of the entrance into the first area is not shorter than the predetermined threshold value, the one or more first controllers determine areas around the first area associated with the first characteristic information as the search target area.

4. The search assist system according to claim 2, wherein the one or more first controllers detect, from an image or a video picked up by a second fixed camera installed for a second area, that a second subject of identification has exited the second area,
    the first storage stores an association among the characteristic information on the second subject of identification, identification information on the second area as the information about the second fixed camera, and information indicating exit of the second subject of identification from the second area, and
    when the first storage stores the first characteristic information and when the first characteristic information is associated with the information indicating exit from the second area, the one or more first controllers determine areas around the second area associated with the first characteristic information as the search target area.

5. The search assist system according to claim 4, wherein the first storage stores an association among the characteristic information on the second subject of identification, the identification information on the second area and identification information on the second fixed camera as the information about the second fixed camera, and the information indicating exit of the second subject of identification from the second area, and
    when the first storage stores the first characteristic information and when the first characteristic information is associated with the information indicating exit from the second area, the one or more first controllers determine any of the areas around the second area that exist in an exiting direction of the second subject of identification from an installation location of the second fixed camera, as the search target area.

6. The search assist system according to claim 1, wherein each vehicle that has received the search instruction from the one or more first controllers sends out the search instruction by vehicle-to-vehicle communication.

7. A search assist apparatus, comprising:
a first storage configured to store characteristic information on one or more subjects of identification detected from images or videos picked up by one or more fixed cameras installed at predetermined locations, respectively, and information about the one or more fixed cameras;
a second storage configured to store location information on a plurality of vehicles each of which has art on-board camera; and
one or more controllers configured to:
receive characteristic information on a subject of search;
determine a search target area based on the information, stored in the first storage, about a fixed camera among the one or more fixed cameras that has picked up an image or a video from which characteristic information on a subject among the one or more subjects of identification matching at least part of the characteristic information on the subject of search detected; and
send, to each vehicle that is present within the search target area, an instruction to send an image or a video picked up by the on-board camera.

8. A search assist method, comprising:
storing, in a first storage, characteristic information on one or more subjects of identification detected from images or videos picked up by one or more fixed cameras installed at predetermined locations, respectively, and information about the one or more fixed cameras;
storing, in a second storage, location information on a plurality of vehicles each of which has an on-board camera;
detecting the characteristic information on the one or more subjects of identification from the images or the videos picked up by the one or more fixed cameras;
receiving characteristic information on a subject of search;
determining a search target area based on the information, stored in the first storage, about a fixed camera among the one or more fixed cameras that has picked up an image or a video from which characteristic information on a subject among the one or more subjects of identification matching at least part of the characteristic information on the subject of search is detected;
sending, to each vehicle that is present within the search target area, a search instruction to search for the subject of search by using the on-board camera; and
outputting an image or a video picked up by the on-board camera from which first characteristic information matching at least part of the characteristic information on the subject of search is detected.

* * * * *

UNITED STATES PATENT AND TRADEMARK OFFICE
CERTIFICATE OF CORRECTION

PATENT NO. : 10,657,660 B2
APPLICATION NO. : 16/392749
DATED : May 19, 2020
INVENTOR(S) : Kazuma Sato It is certified that error appears in the above-identified patent and that said Letters Patent is hereby corrected as shown below:

In the Claims

On Column 29, Line 34, the word "the" is added between "based on" and "information".

On Column 31, Lines 9-10, the word "art" is replaced with "an".

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*